United States Patent [19]

Nowicki et al.

[11] Patent Number: 4,680,000
[45] Date of Patent: Jul. 14, 1987

[54] APPARATUS FOR APPLYING LABELS IN THE MOLDS OF A PLASTIC BLOW MOLDING MACHINE

[75] Inventors: Casimir W. Nowicki, Sylvania; Thomas A. Lucius, Toledo; Ronald S. Kaminski, Bowling Green; Robert P. Snyder, Sylvania, all of Ohio

[73] Assignee: Owens-Illinois, Inc., Toledo, Ohio

[21] Appl. No.: 802,117

[22] Filed: Nov. 25, 1985

[51] Int. Cl.$^4$ ............................................. B29C 49/24
[52] U.S. Cl. .............................. 425/126 R; 198/689.1; 264/509; 271/103; 271/196; 271/276; 425/254; 425/504; 425/540; 425/576; 425/582; 425/584
[58] Field of Search ............... 425/159, 200, 576, 580, 425/584, 582, 254, 255, 126 R, 503, 504, 522, 526, 539, 540; 264/509; 271/99, 100, 101, 102, 103, 106, 107, 276, 194, 197, 307, 308, 312; 198/689.1

[56] References Cited

U.S. PATENT DOCUMENTS 3,527,367 9/1970 Bivans ................................. 271/102
4,046,613 9/1977 Kucheck ............................. 271/197
4,397,625 8/1983 Hellmer et al. ..................... 425/522
4,523,904 6/1985 Martin ................................. 425/540
4,549,865 1/1985 Myers ................................. 425/526

Primary Examiner—Jay H. Woo
Assistant Examiner—Timothy W. Heitbrink
Attorney, Agent, or Firm—Philip M. Rice

[57] ABSTRACT

Apparatus for applying labels in the molds of a plastic blow molding machine of the type wherein a plurality of sets of molds are mounted on a wheel rotatable about a horizontal axis and the molds are moved toward and away from one another to enclose a parison and the parison is then blown to the confines of the cavity between the mold sections which comprises removing labels successively from one or more magazines, depositing the labels on an endless conveyor which transports the labels to a position adjacent an open mold and laterally transferring the labels from the conveyor to a position within the molds such that when a mold closes about a plastic parison and the parison is blown, the labels become adhered to the blown plastic bottle.

63 Claims, 28 Drawing Figures

APPARATUS FOR APPLYING LABELS IN THE MOLDS OF A PLASTIC BLOW MOLDING MACHINE

This invention relates to plastic blow molding machines and particularly to machines for delivering labels to an open mold so that they can be adhered to the plastic article when the mold is closed about a parison and the parison is blown to the confines of the mold.

BACKGROUND AND SUMMARY OF THE INVENTION

It is common to make hollow plastic articles such as containers by closing a mold about a heated parison and blowing the parison outwardly against the confines of the mold to form the hollow article. More recently, it has been suggested that labels can be delivered to an open mold and deposited in the cavity of the mold so that when the mold is closed and the parison is blown, the labels become adhered to and become a part of the blown hollow article.

In U.S. Pat. No. 4,397,625, a reciprocating carriage is utilized to pick up labels from hoppers mounted on the frame of the blow molding machine and deliver them to the sections of the mold. Such an arrangement thus becomes a fixed part of the machine and provides for simultaneously delivering labels to both sections of the mold.

In certain types of machines, the space for delivery of the label into the open mold is limited because of the construction of the machine. More specifically, in one type of blowing molding apparatus, a plurality of sets of molds are mounted on a wheel rotatable about a horizontal axis and the molds are moved toward and away from one another to enclose a parison and the parison is then blown by application of air to the confines of the cavity between the mold sections as the wheel rotates. In such an arrangement, the space is extremely limited and the problem of placement of labels in the open mold is difficult. The blown articles are usually taken out of the blow molding apparatus at the twelve o'clock position and the extruded parison is introduced at the three o'clock position such that the area during which the molds are open therebetween is limited. Where two labels are to be delivered for placement on opposite sides of the hollow article, the problem is more difficult. The problem is further complicated when the molds have plural cavities and labels are to be delivered simultaneously to the plural cavities.

Accordingly, among the objectives of the invention are to provide a method and apparatus for delivering labels between the sections of an open mold; which method and apparatus is particularly applicable to an apparatus of the wheel type above defined; which can be utilized to apply two labels to opposite sides of a hollow article; wherein labels will not be delivered to only one side of a mold cavity if a label is not in position for delivery to the other side; which can be applied to multiple cavity molds such as dual cavity molds; which will accommodate various size labels; which can be readily converted from use with single cavity to double cavity molds; wherein the label delivery can be interrupted without moving the label delivery apparatus from its position adjacent the blow molding apparatus so that the blow molding apparatus can continue to be used; and which is readily synchronized in its movement with the plastic blow molding machine.

In accordance with the invention, a method and apparatus for applying labels in the molds of a plastic blow molding machine comprises removing labels successively from one or more magazines, depositing the labels on an endless conveyor which transports the labels to a position adjacent an open mold and laterally transferring the labels from the conveyor to a position within the molds such that when the mold closes about a plastic parison and the parison is blown, the labels become adhered to the blown plastic bottle.

DESCRIPTION

Figure 1:
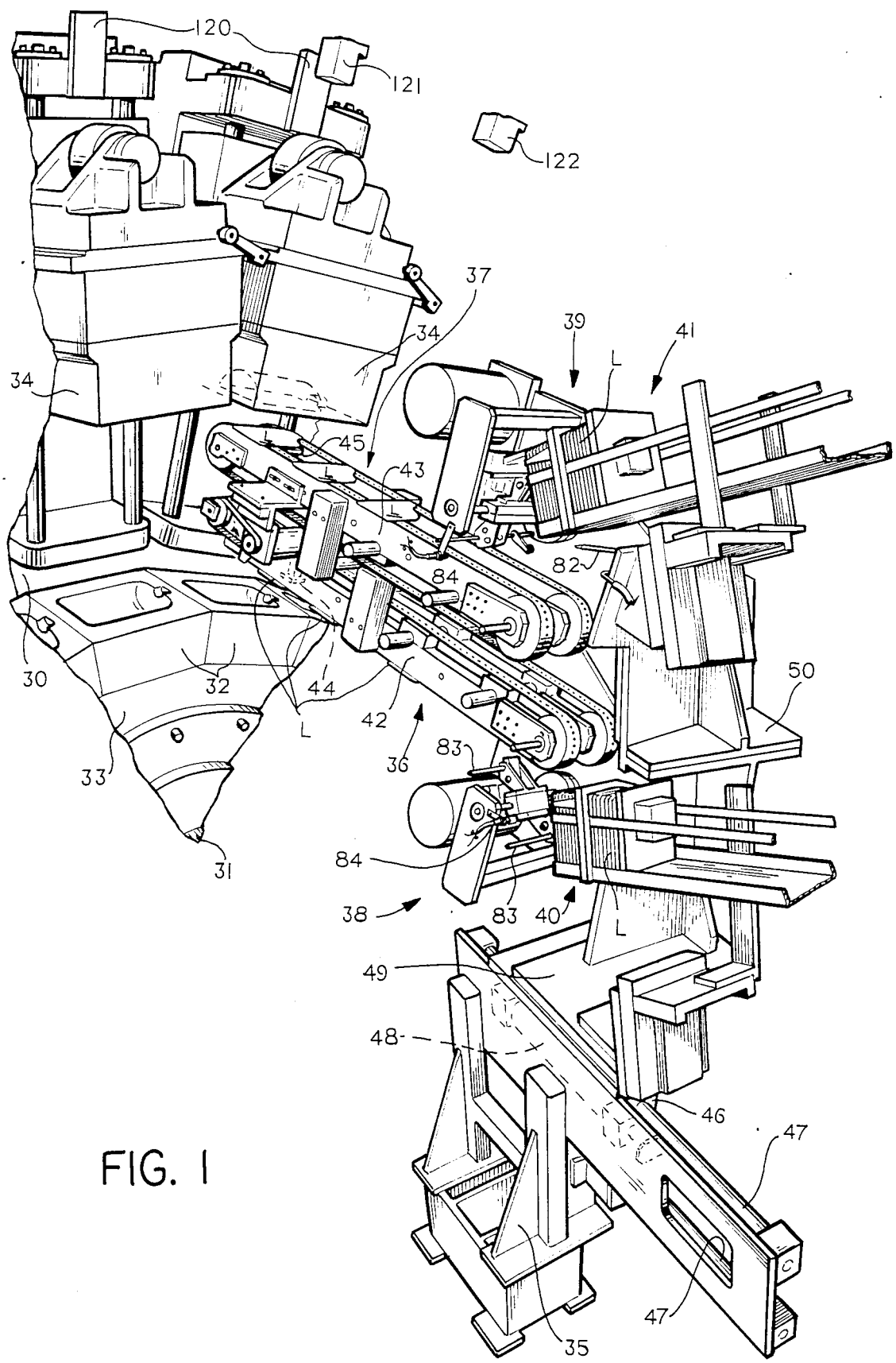
FIG. 1 is a fragmentary perspective view of a blow molding apparatus embodying the in mold labeling apparatus.
Figure 2:
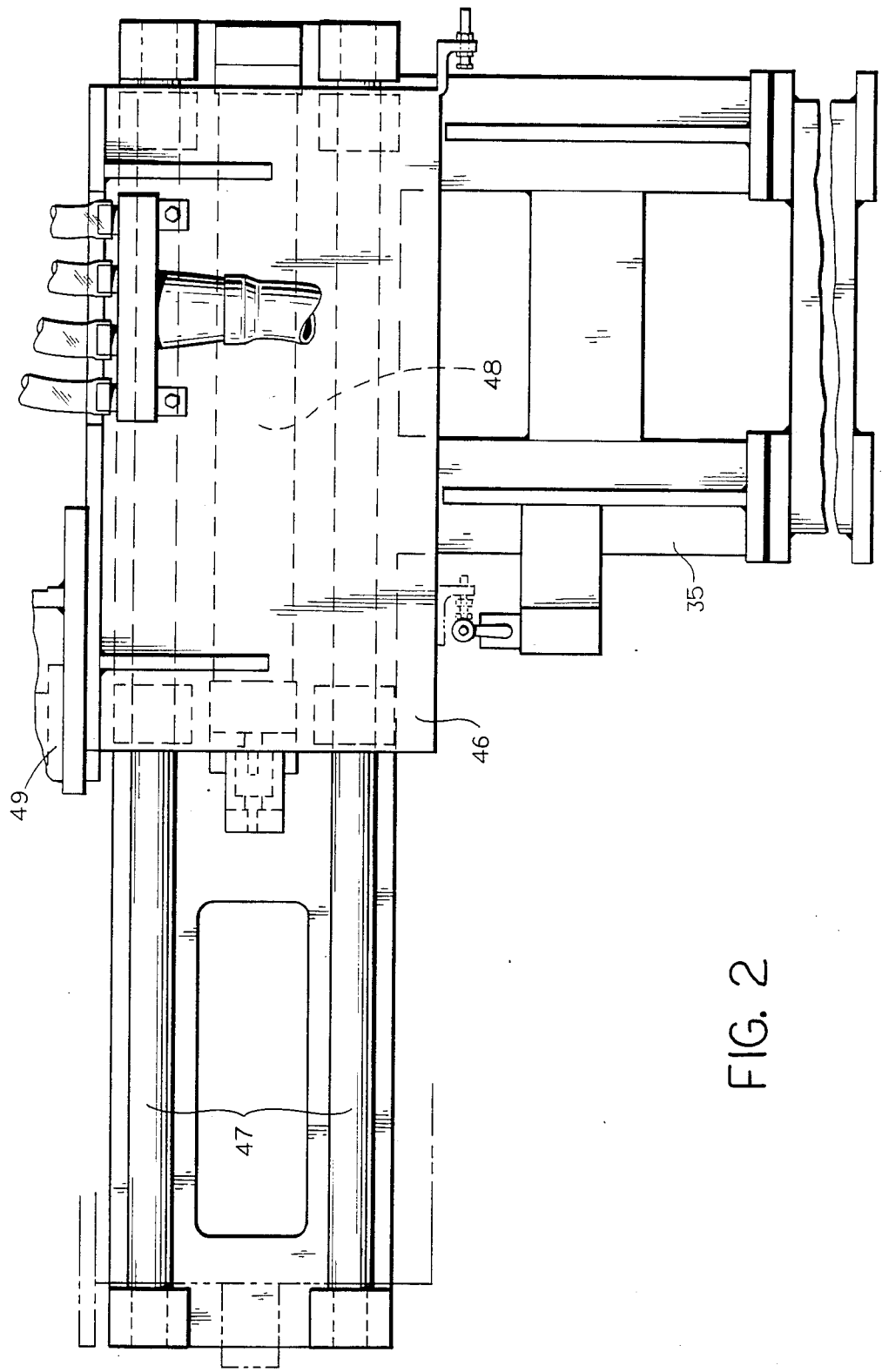
FIG. 2 is a side elevational view of the lower portion of the apparatus taken from the right as viewed in FIG. 1.

Referring to FIG. 1, the invention is particularly applicable to a blow molding apparatus comprising a wheel plate 30 which is mounted on a shaft 31 extending horizontally for rotation on a frame F and a plurality of sets of molds are provided in circumferentially spaced relation about the wheel plate 30, each set comprising a pair of mold sections, a first mold section 32 being mounted on the hub 33 on the shaft 31 and a second mold section 34 being mounted on the wheel plate 30 in radial alignment with the first mold section 32 and movable toward and away from the first mold section 32 to open and close the mold. As the wheel rotates, at the three o'clock position where the molds are open, an extruder (not shown) delivers a parison between an open mold so that when the mold is closed, the parison can be blown to form the hollow article such as a container. At the twelve o'clock position, the hollow articles are removed. The blow molding apparatus is more fully shown in U.S. Pat. No. 4,523,904 and U.S. patent application Ser. No. 594,076 now U.S. Pat. No. 4,549,865 filed Mar. 28, 1984, which are incorporated herein by reference.

In accordance with the invention, the method and apparatus delivers successively one or more labels between the open mold sections at a position prior to delivery of the parison, herein shown to be at the one o'clock position.

Referring to FIGS. 1-5, the apparatus is shown for delivering two labels, one to the cavity of each mold section, and comprises a base 35 which supports a lower label mechanism 36 and an upper label mechanism 37. Each of the mechanisms 36, 37 includes a vacuum pickup mechanism 38, 39 that removes labels L successively from a magazine 40, 41 and deposits them in spaced relation on a vacuum conveyor 42, 43 of the mechanism. The conveyors 42, 43 deliver the labels successively to a point adjacent the open mold sections 32, 34 and a label placement mechanism 44, 45 associated with each label mechanism 36, 37 operates to remove the label and deliver it to its respective mold section 32, 34.

Referring to FIGS. 1-4, the lower and upper delivery mechanisms 36, 37 are mounted for movement toward and away from the blow molding machine so that they can be simultaneously removed when they are not to be used or to provide access to the machine. More specifically, a slide 46 is mounted on vertically spaced horizontal shafts 47 on the base 35 for sliding movement along the shafts by energizing a cylinder 48. The lower delivery mechanism 36 includes a frame 49 with a horizontal plate that is mounted on the slide 46 and the upper delivery mechanism 38 includes a frame 50 with a horizontal bottom plate that is adjustably mounted on the frame 49 of the lower label delivery mechanism and is adjustable along a track defined by a groove 51 and key 52 thereon for engaging the groove with a nut 53 and bolt 54 threaded arrangement therebetween.

Each of the upper and lower label delivery mechanisms 36, 37 is substantially identical and is generally a mirror image of the other. For purposes of clarity, only one will be described.

Referring to FIGS. 5, 8 and 11-14, the upper label pickup mechanism 45 is mounted on the frame 50 and comprises a plurality of sets of vacuum cups 55 mounted on a radial arm. Each set of vacuum cups 55 is mounted on a bar 56 which is connected by a parallelogram linkage 57 with an arm 58 projecting from a two-piece square hub 59 which, in turn, is clamped on a hexagonal shaft 60. A spring 61 normally urges each pair of the links 57 to a position where the links abut the square hub 59 and may be moved radially outwardly for engagement with a label L in magazine 41 and thereafter deposition onto the conveyor. The shaft 60 and associated hub 59 are rotated by a belt 62 trained over a pulley 63 fixed on the shaft 60 which is rotatably mounted by bearings 64, 65 on the frame 51. The belt 62 is trained over additional pulleys 66, 67, 68 for driving the conveyor, as presently described, and receiving drive from a motor M on the frame 51.

Figure 8:
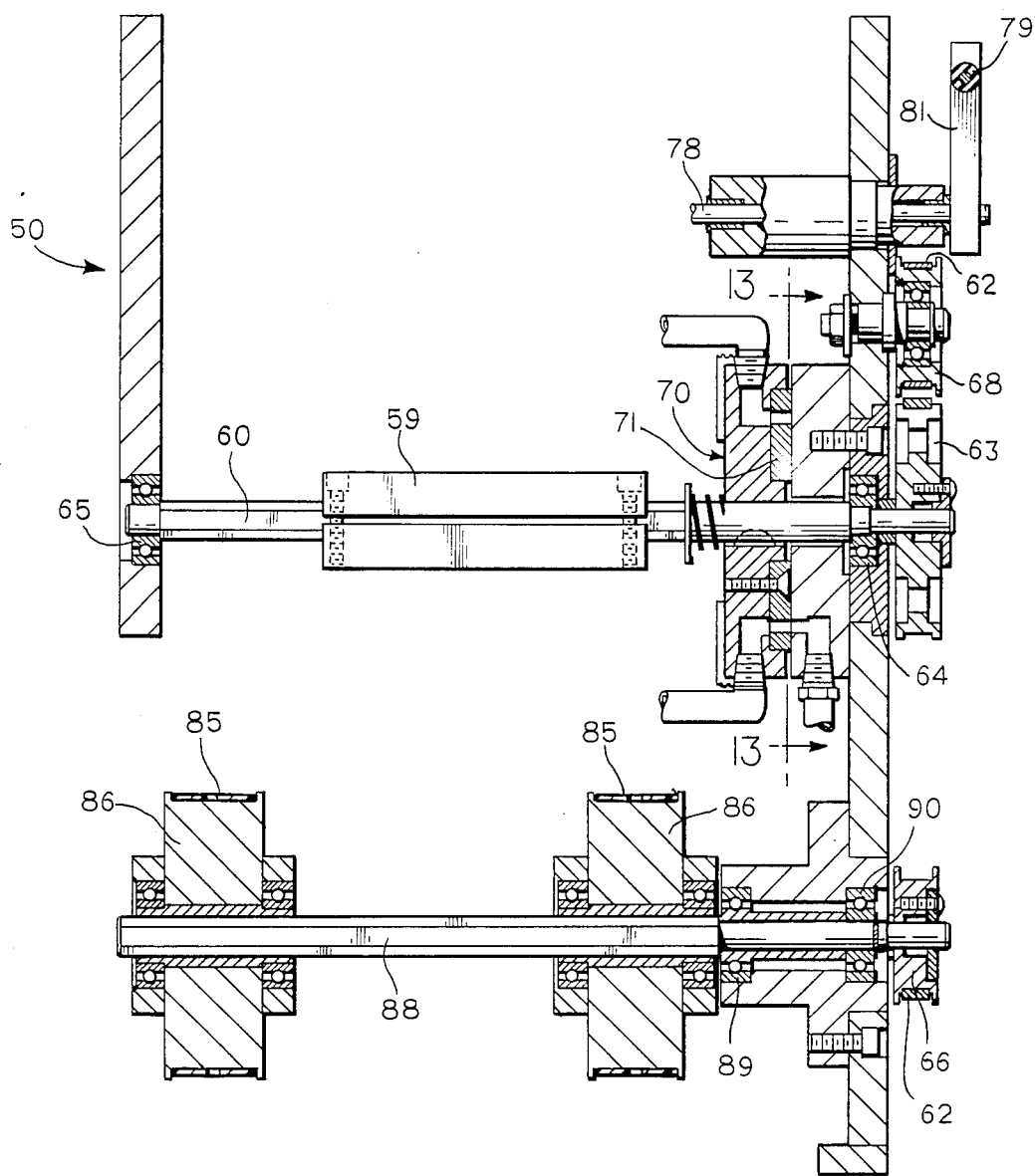
FIG. 8 is a fragmentary sectional view taken along the line 8—8 in FIG. 12, parts being broken away.
Figure 9:
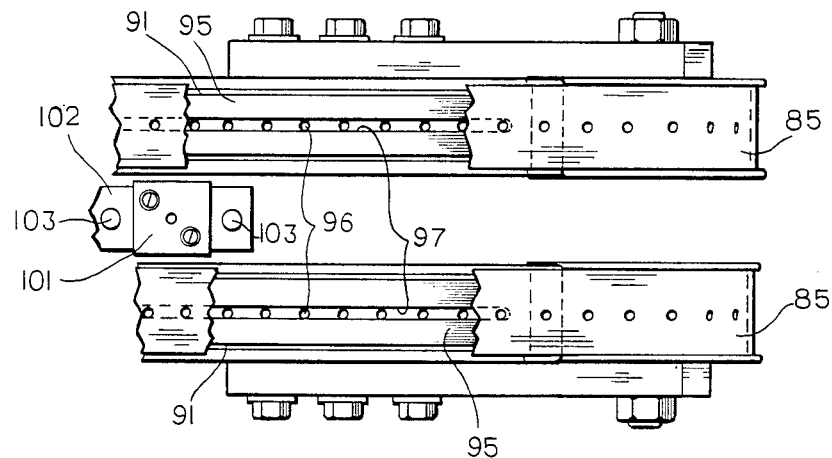
FIG. 9 is a fragmentary plan view of a portion of the conveyor of the apparatus.
Figure 10:
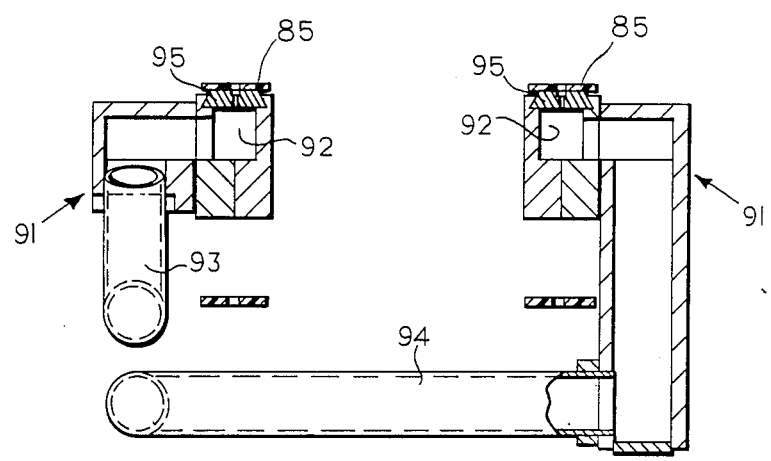
FIG. 10 is a sectional view taken along the line 10—10 in FIG. 4.
Figure 13:
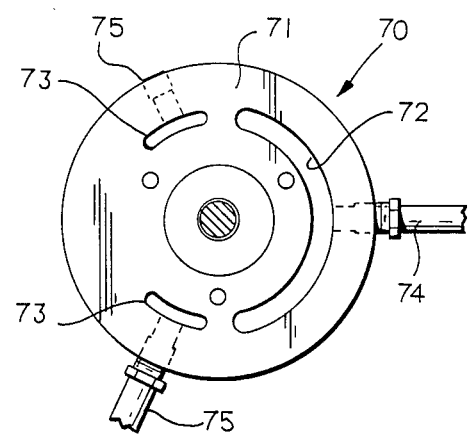
FIG. 13 is a view taken along the line 13—13 in FIG. 8.
Figure 14:
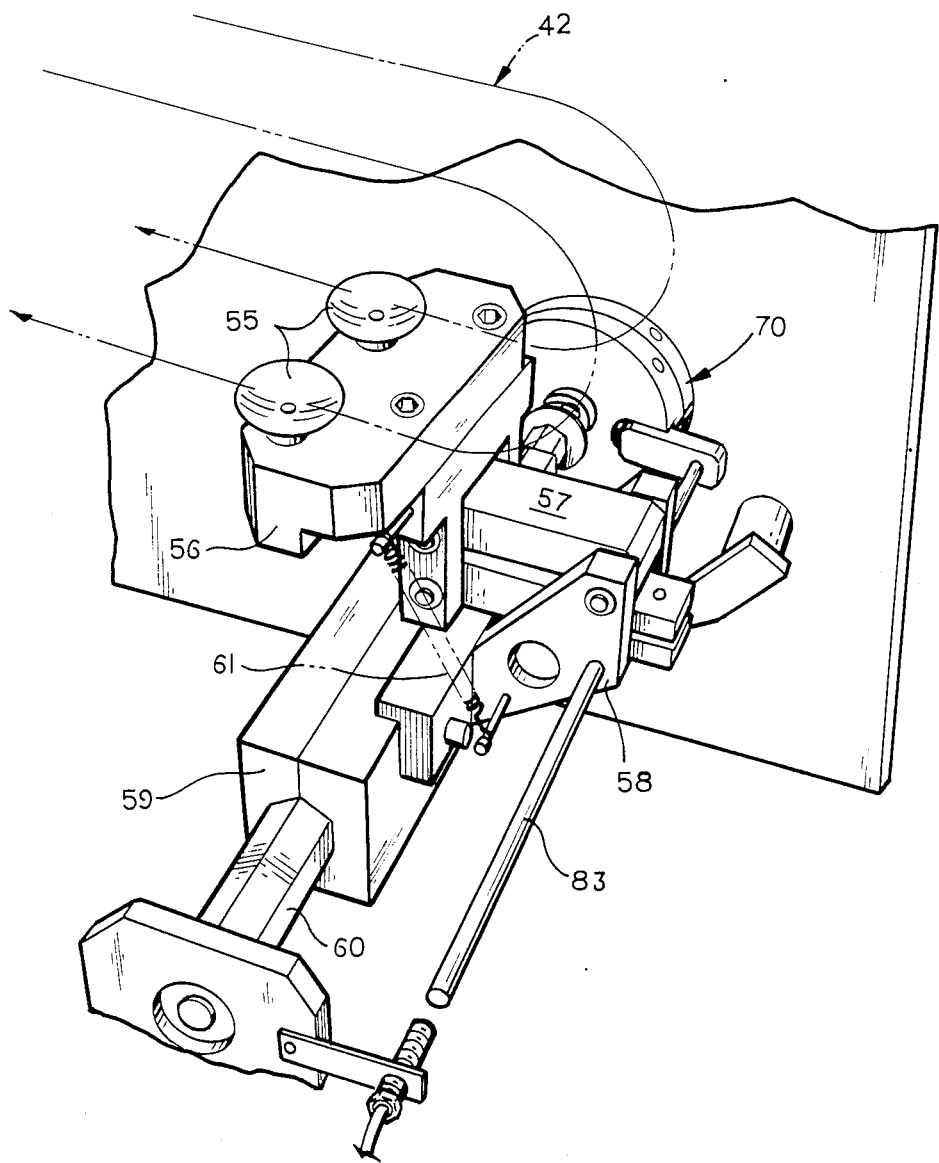
FIG. 14 is a partly diagrammatic fragmentary view of a portion of the apparatus shown in FIG. 11, parts being broken away.
Figure 15:
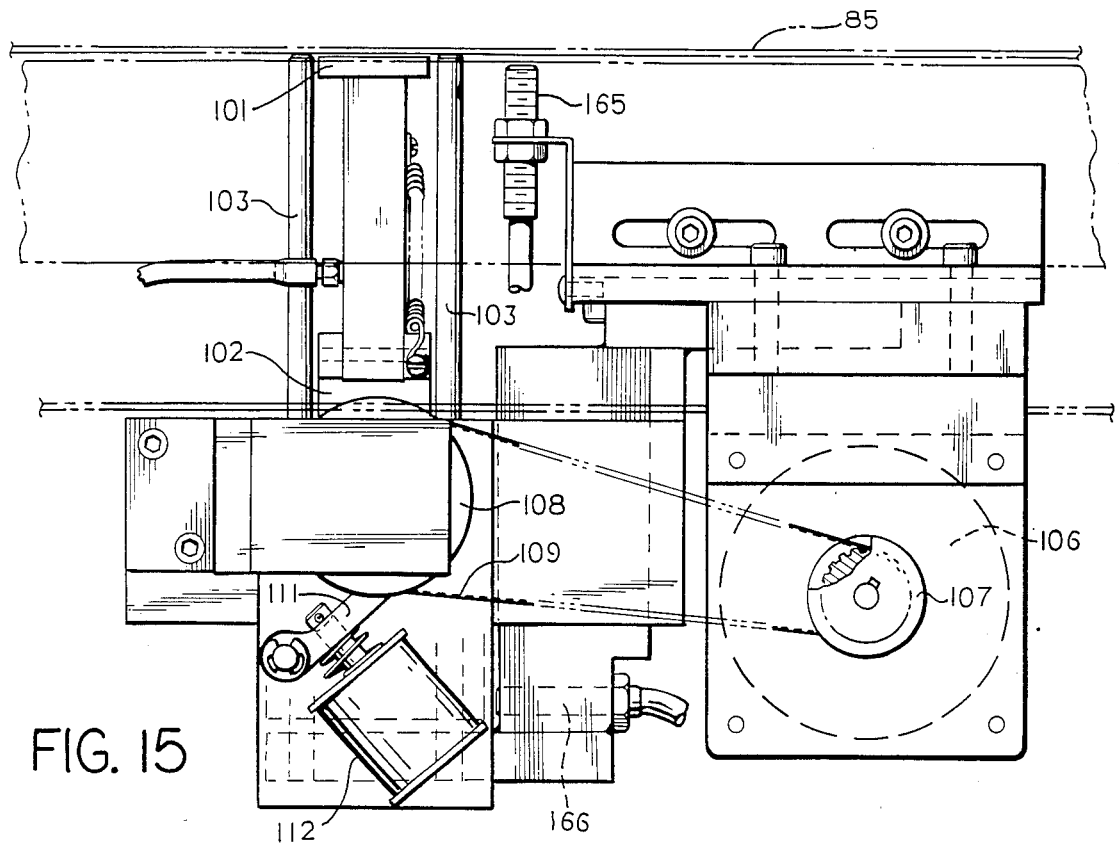
FIG. 15 is a side elevational view on an enlarged scale of the right-hand portion of the apparatus as shown in FIG. 4.
Figure 16:
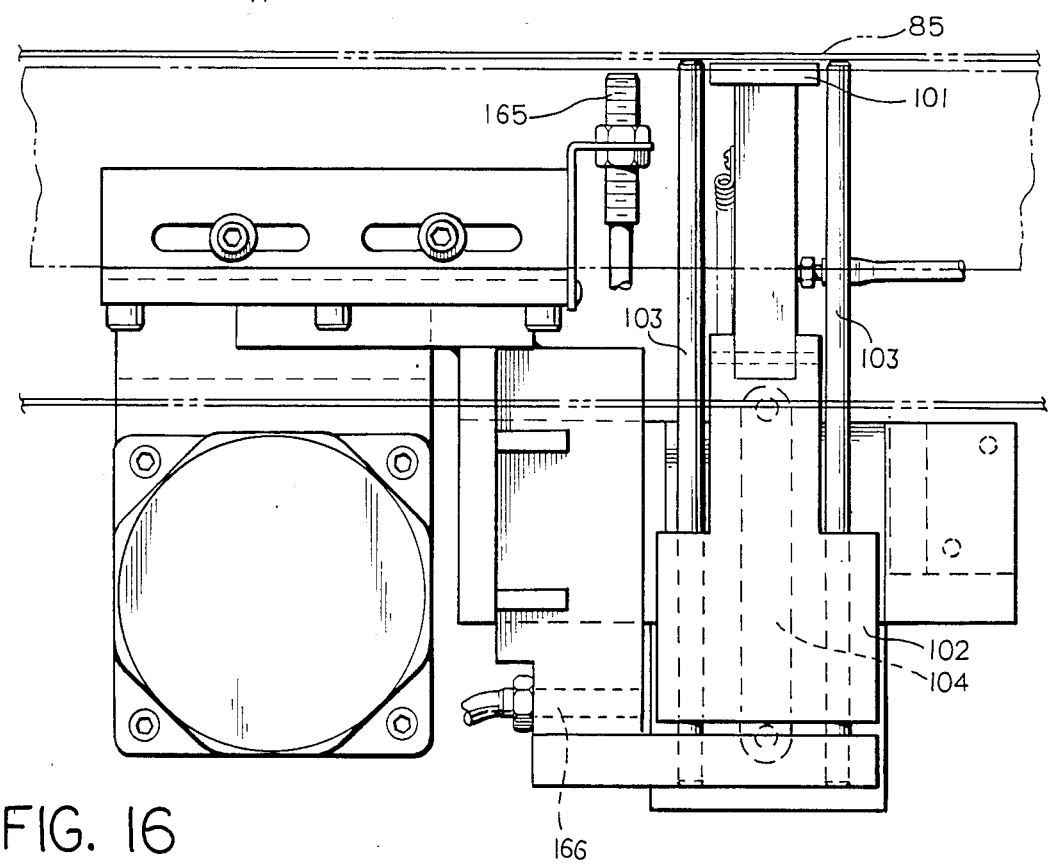
FIG. 16 is a plan view of the apparatus shown in FIG. 16.
Figure 17:
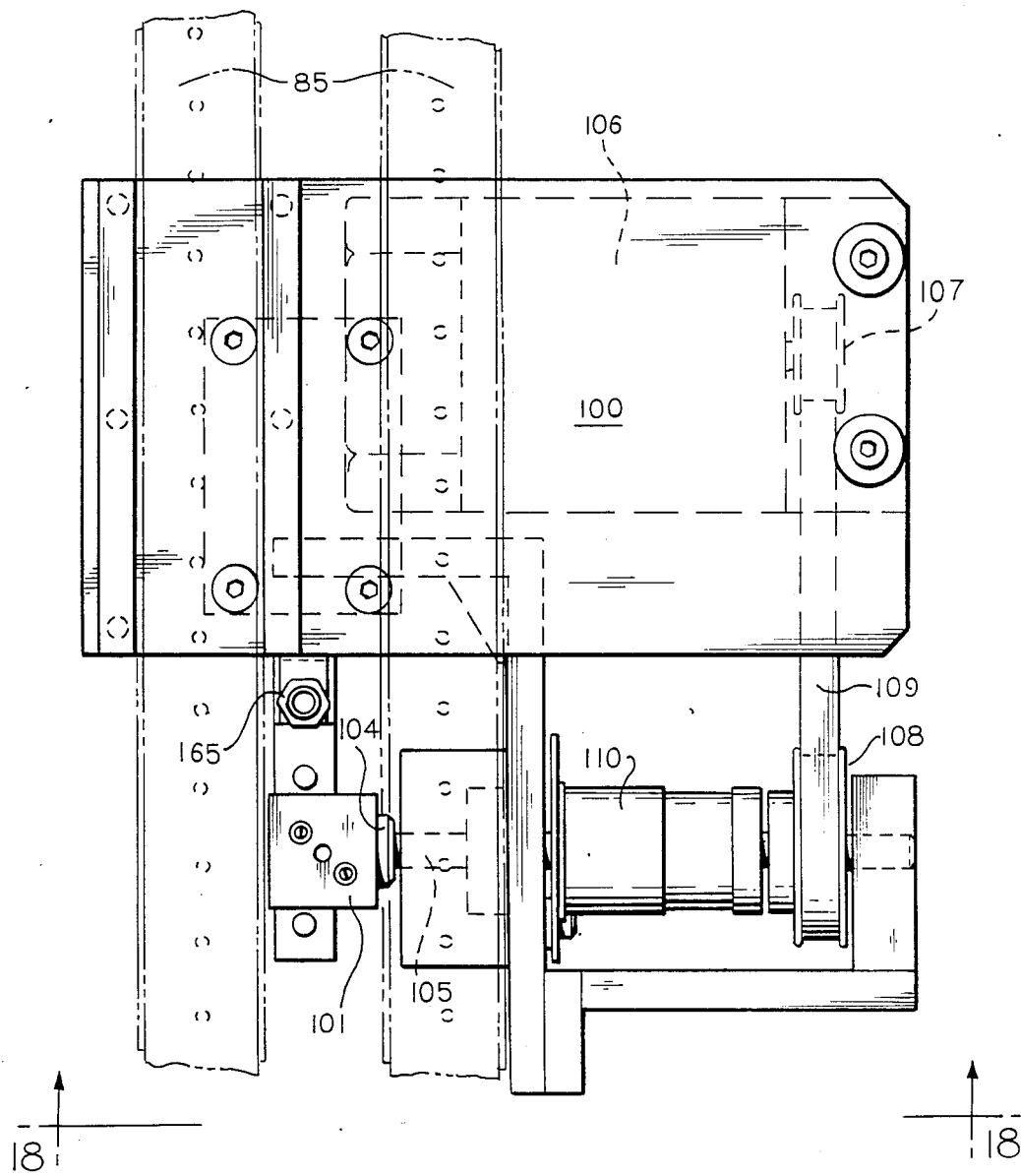
FIG. 17 is a view taken along the line 17—17 in FIG. 4.
Figure 18:
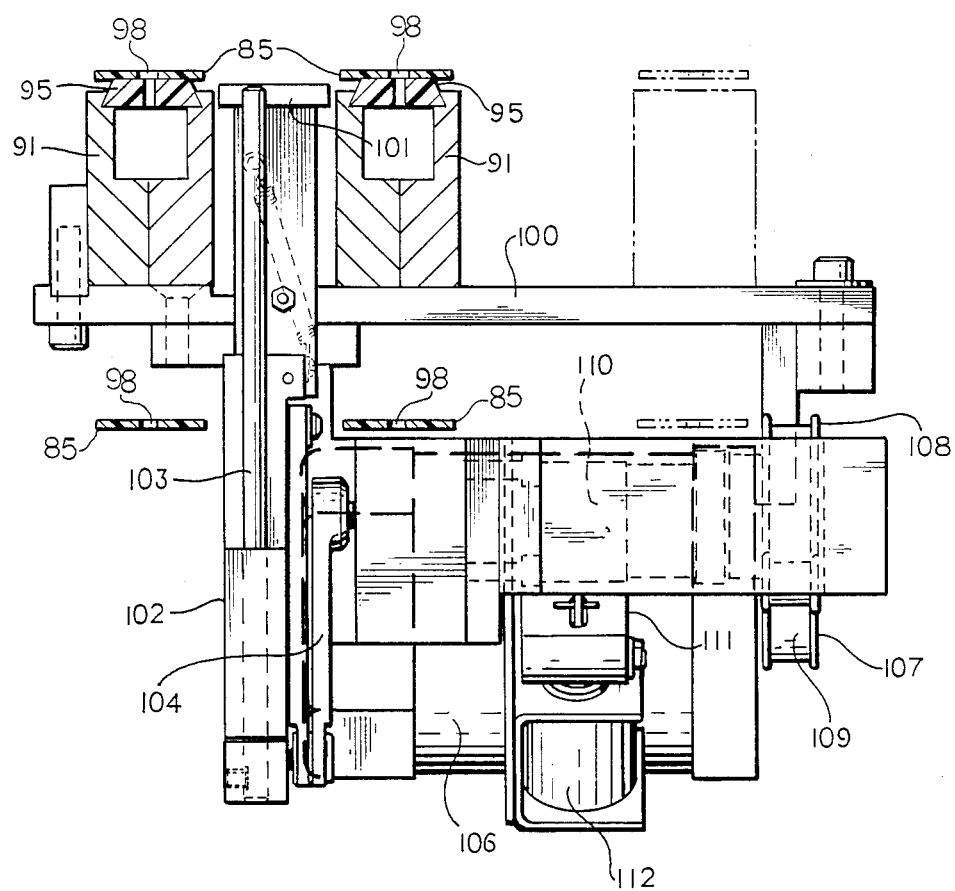
FIG. 18 is a fragmentary sectional view taken along the line 18—18 in FIG. 17.
Figure 19:
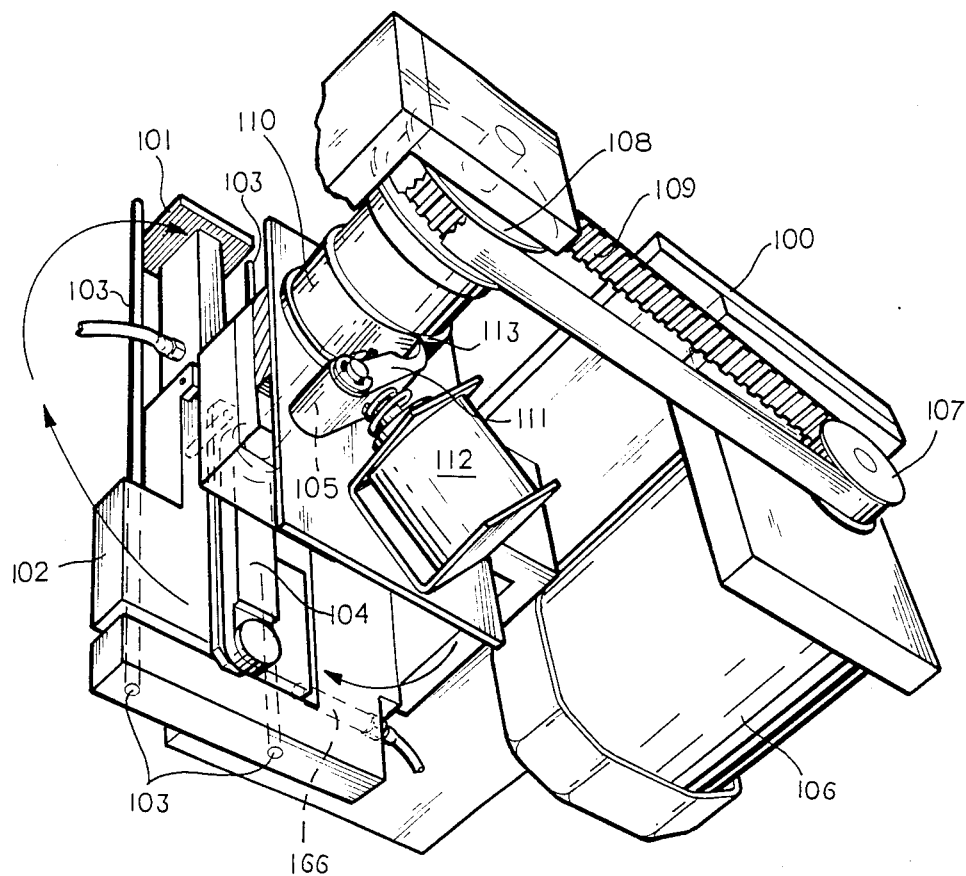
FIG. 19 is a fragmentary perspective view of the portion of the apparatus shown in FIGS. 15-18.
Figure 20:
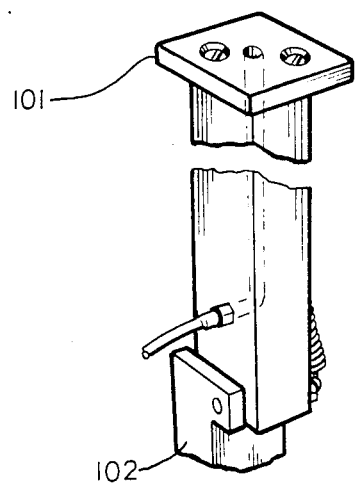
FIG. 20 is a perspective view of a part of the apparatus shown in FIGS. 15-19.

As further shown in FIGS. 8 and 13, a distributor valve 70 functions to apply vacuum when the vacuum cups 55 are adjacent the magazine and release the vacuum and apply air when the vacuum cups 55 are adjacent the conveyor thereby depositing the labels L onto the conveyor. The distributor valve 70 includes a fixed distributor valve plate 71 that includes a vacuum slot 72 and air slots 73 that communicate respectively with a vacuum 74 and air 75.

Figure 11:
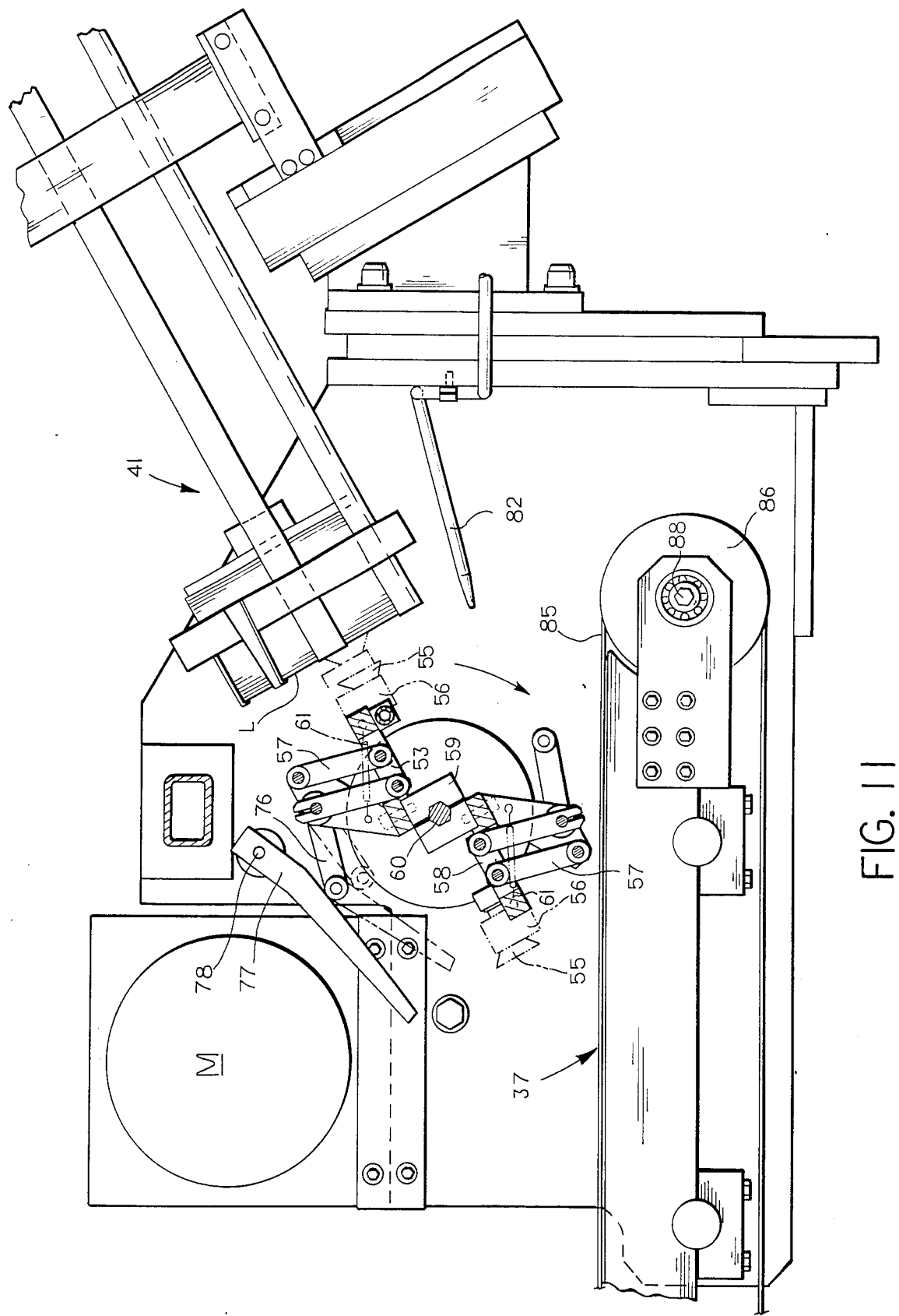
FIG. 11 is a sectional view taken along the line 10—10 in FIG. 5.
Figure 12:
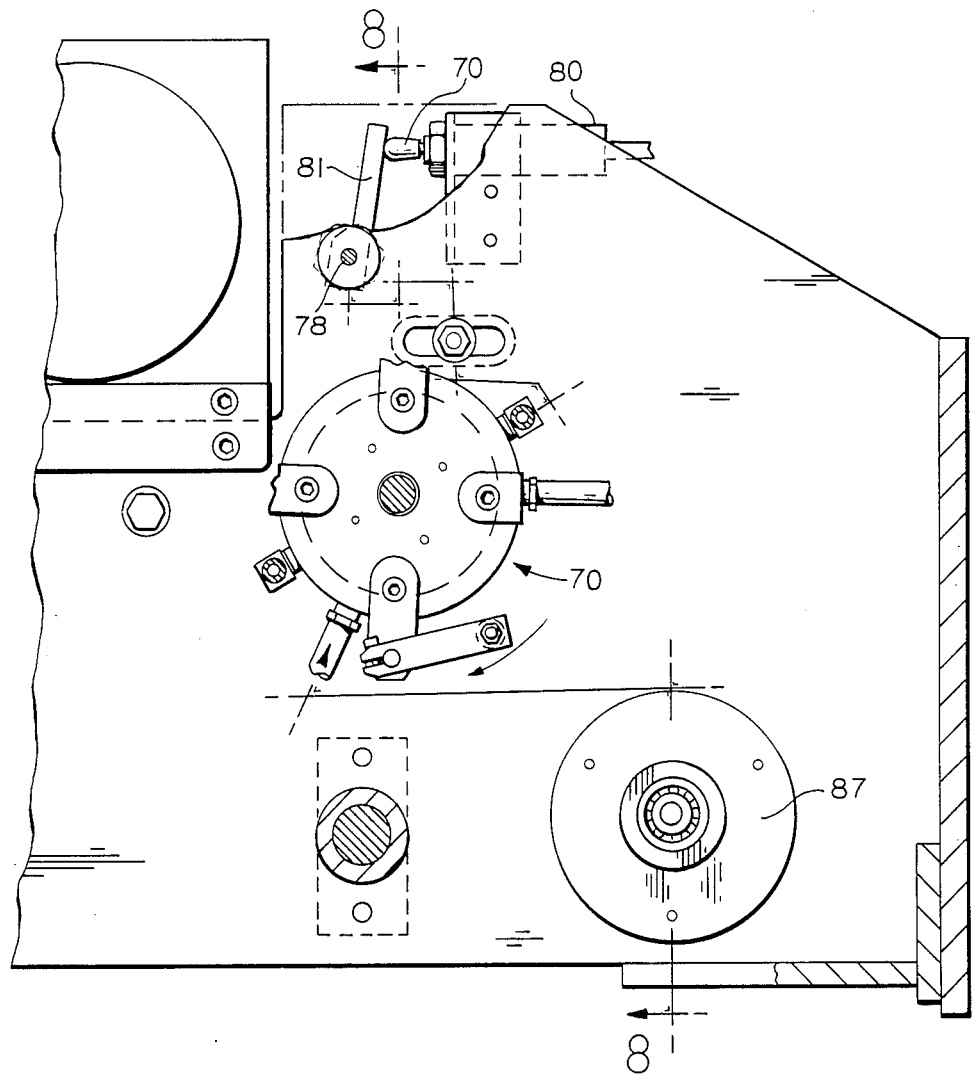
FIG. 12 is a sectional view taken along the line 12—12 in FIG. 5.

Referring to FIGS. 11 and 12, the parallelogram linkage is actuated for moving the vacuum cups radially inwardly and outwardly by an arrangement which includes a lever 76 having a roller engageable with a cam 77. The cam is normally in the position shown in FIG. 11 but, upon rotation, engages the lever 77 to move lever 76 to the broken line position shown in FIG. 11 moving the vacuum cups 55 into engagement with a label L in the magazine 41. The movement of the cam 77 is achieved by rotating the shaft 78 by engagement of the plunger 79 of a pneumatical cylinder 80 with a lever 81 on the shaft so that when the air is supplied to the cylinder 80, the shaft is rotated swinging the cam 77 to the broken line position shown in FIG. 11. As the shaft 60 is rotated in a clockwise direction as viewed in FIG. 11, the vacuum cups 55 with a label thereon are retracted by the spring 61 and the vacuum cups 55 deposit the labels L on the conveyor in a predetermined longitudinal position by release of the vacuum and application of air. The position of the vacuum cups as the cups approach the conveyor 37 is such that the label is substantially tangential. To assist in the movement of the label and prevent it from becoming folded over during the movement, an air jet 82 applies air to the leading edge of the label L as it approaches the conveyor. Each arm 58 includes a sensor arm 83 (FIG. 14) which is associated with a sensor switch such as a proximity switch 84 for purposes presently described.

Referring to FIGS. 6-10, the upper conveyor 43 comprises horizontally spaced belts 85 trained over longitudinally spaced pairs of pulleys 86, 87. Pulleys 86 at one end nearest the magazine are mounted on a shaft 88 rotatably mounted in frame 51 by bearings 89, 90. Drive pulley 66 is mounted on shaft 88. The belts 85 are trained over manifold assemblies 91, each of which has a manifold chamber 92 supplied with vacuum by pipes 93, 94. A plastic rail 95 is provided in overlying relationship to each manifold chamber 92 and has a plurality of longitudinally spaced openings 96 providing communication to a longitudinally extending groove 97 underlying openings 98 in each belt 85. As the belts 85 move along the grooves 97, vacuum is applied to the belts and, in turn, to any labels on the belts.

Each label placement mechanism 44, 45 is substantially identical but for purposes of clarity only one will be described.

Each label placement mechanism 44, 45 includes a reciprocating vacuum head 101 which functions to lift the label L from the belts 85 and move it generally vertically into the cavity of the respective mold section where it is deposited by cutting off the vacuum to the head 101 and permitting the air holes that are normally in the mold to hold the label L in position in the mold.

Referring to FIGS. 1, 4 and 15–20, the label placement mechanism includes a frame 100 mounted on the frame that supports the conveyor and includes a vacuum pad 101 mounted on a slide 102 that is movable longitudinally on spaced shafts 103 on the frame 100. The pad 101 is reciprocated longitudinally by a single rotation of an arm 104 that is pivoted to the lower end of the slide 102 and is mounted on the shaft 105 driven by a motor 106 through pulleys 107, 108 and a belt 109. The motor 106 is continuously driven and intermittent drive is provided by a clutch 110 interposed between shaft 105 and pulley 108. Clutch 110 is normally held in disengaged position by a spring loaded pawl 111. Energization of a solenoid 112 retracts the pawl 11 permitting a single revolution which comprises a lifting of the label L off of the belts by pad 101 and returning of the pad 101 to its original position. After the one revolution, the pawl 111 engages a tooth 113 to disengage the clutch.

In operation, the vacuum pickup mechanisms 38, 39 remove labels from the magazines and deposit them on the conveyors 42, 43, the upper conveyor having the labels deposited to the upper surface thereof and the lower conveyor having the labels deposited to the lower surface thereof. The conveyors 42, 43 transport and deliver the labels successively to a point adjacent the open mold sections 32, 34 where the label placement mechanisms 44, 45 are actuated to deliver the labels to the respective mold sections 32, 34.

The motors M are energized intermittently by a circuit associated with sensors 84 to provide the drive for the label pickup mechanisms 38, 39 and conveyors 42, 43 which set the proper spacing of the labels along the conveyors. The motor 106 is driven continuously.

As a mold approaches the label mechanism, a sensor block 120 on the wheel plate passes a first sensor 121 on the frame F and produces a signal to actuate the first label pickup mechanism and the conveyor mechanism, applying a label to a conveyor and causing the conveyor to index the proper distance carrying the previous labels toward the mold sections and bringing the label L nearest the mold section into position for delivery. At the same time, the label in position for delivery is deposited in the mold section by the pad by energization of the solenoid 112.

Figure 3:
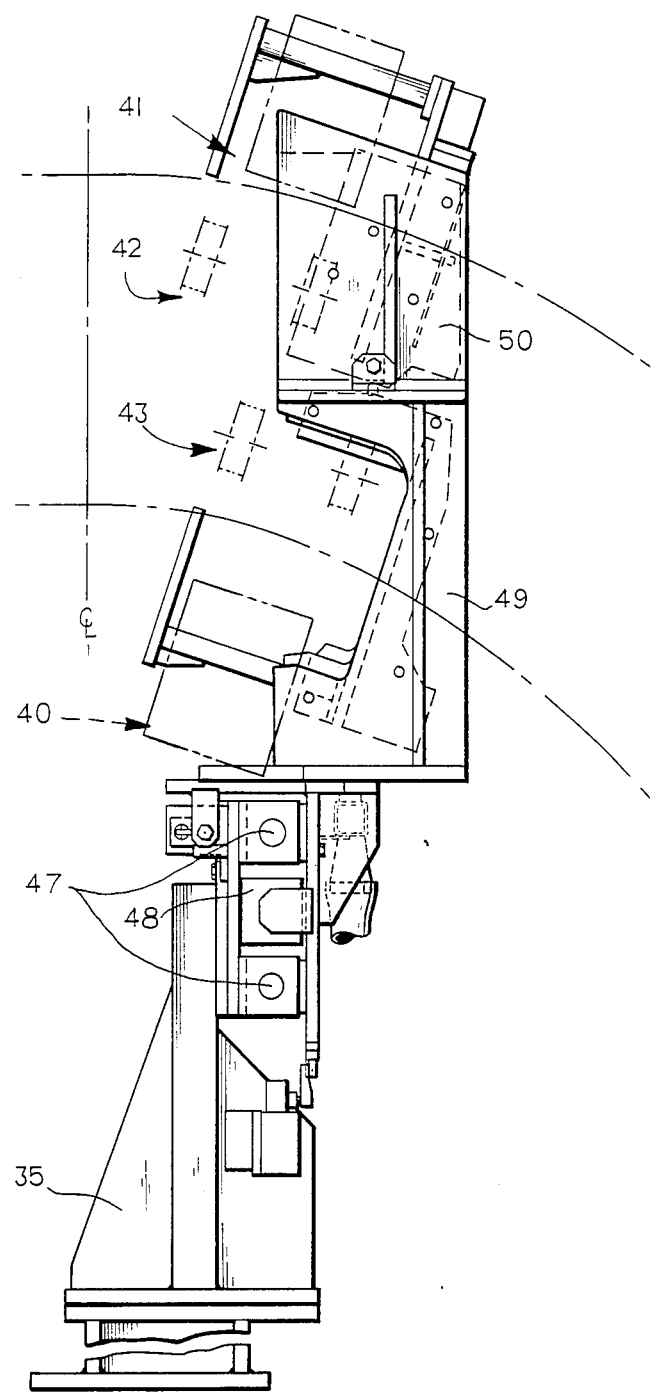
FIG. 3 is an end view of the in mold labeling apparatus taken from the right as viewed in FIG. 1 with parts being broken away.
Figure 4:
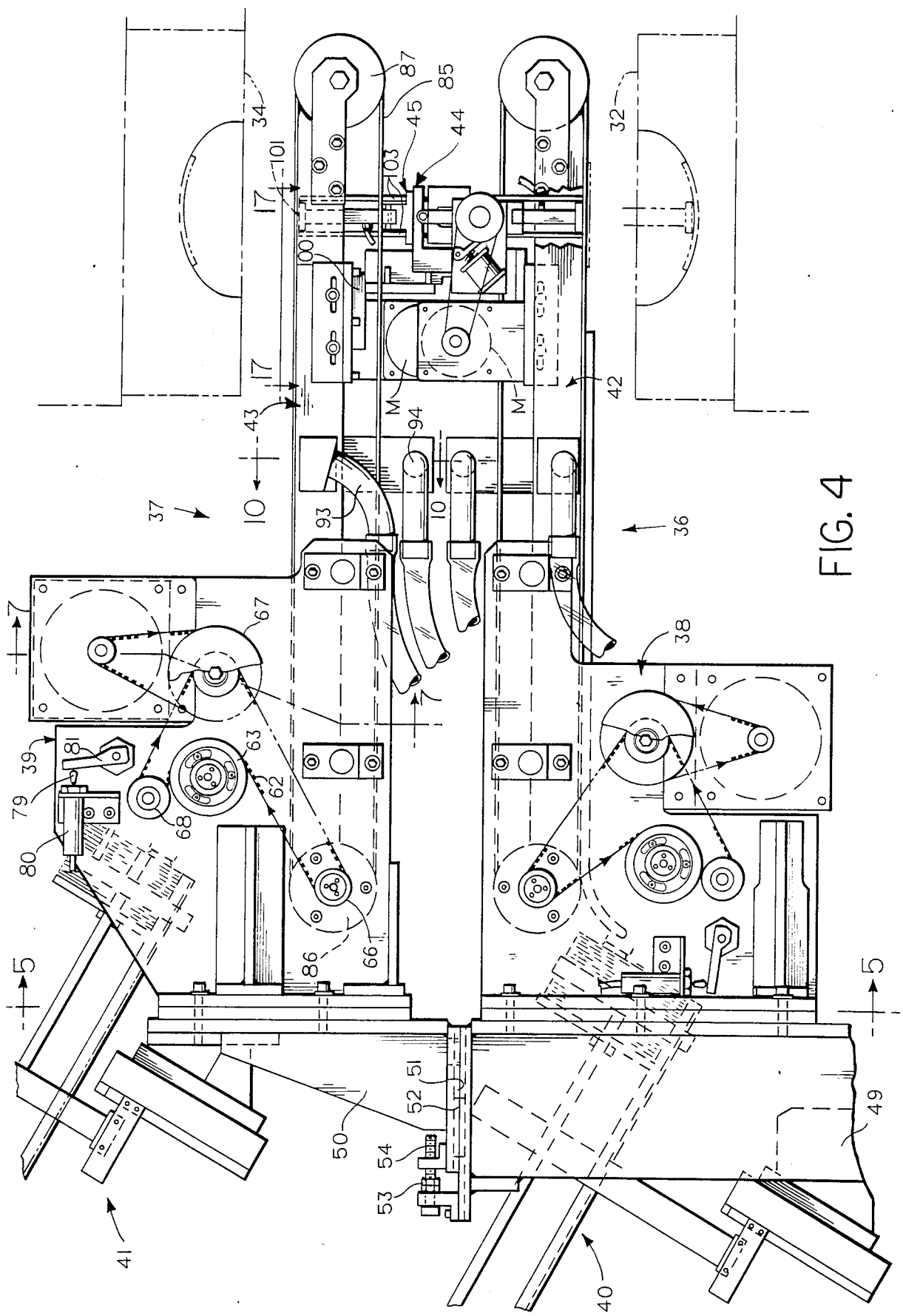
FIG. 4 is a side elevational view of the in mold labeling apparatus taken from the right as viewed in FIG. 1.
Figure 5:
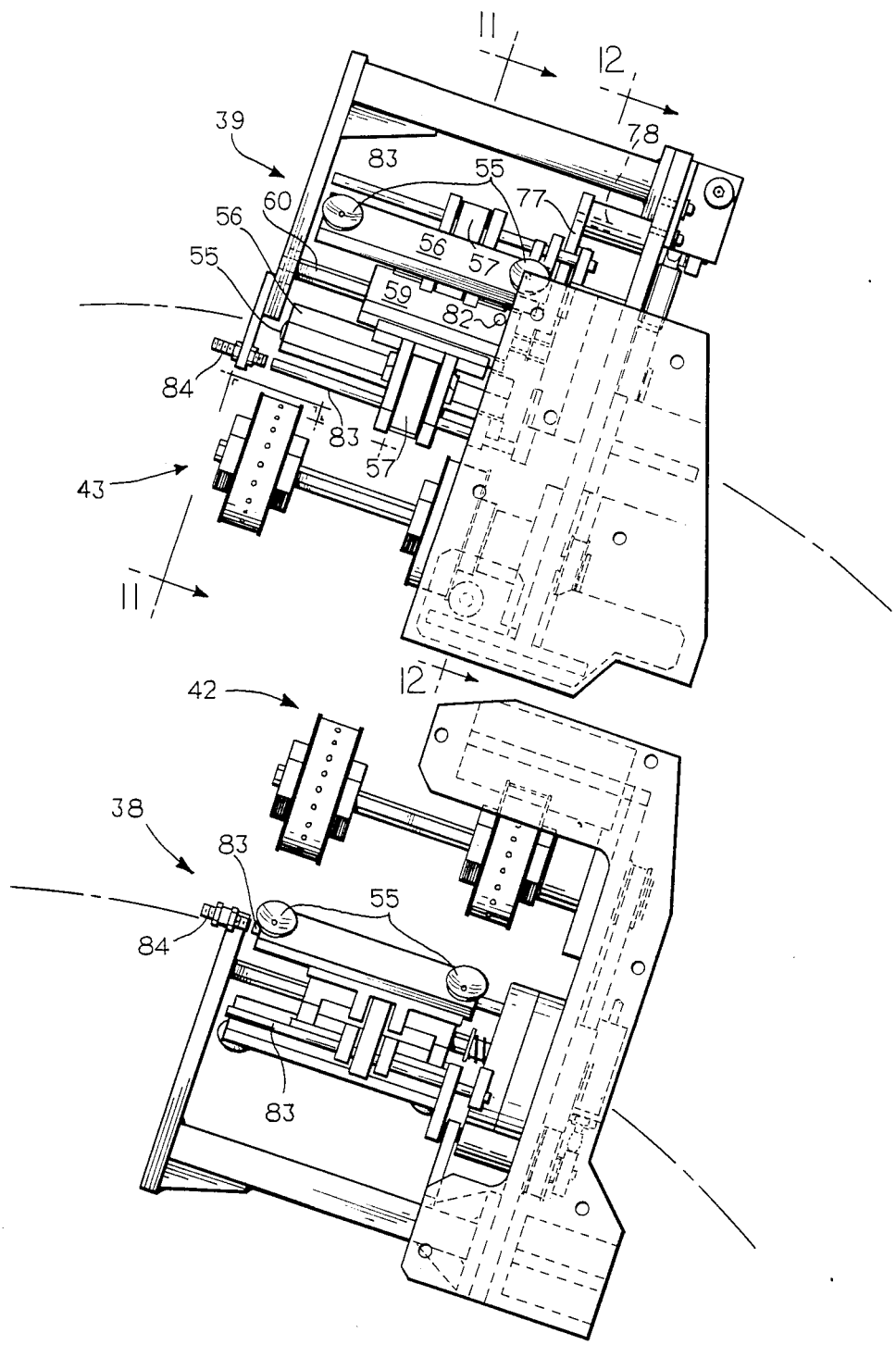
FIG. 5 is an end view taken along the line 5—5 in FIG. 4.
Figure 6:
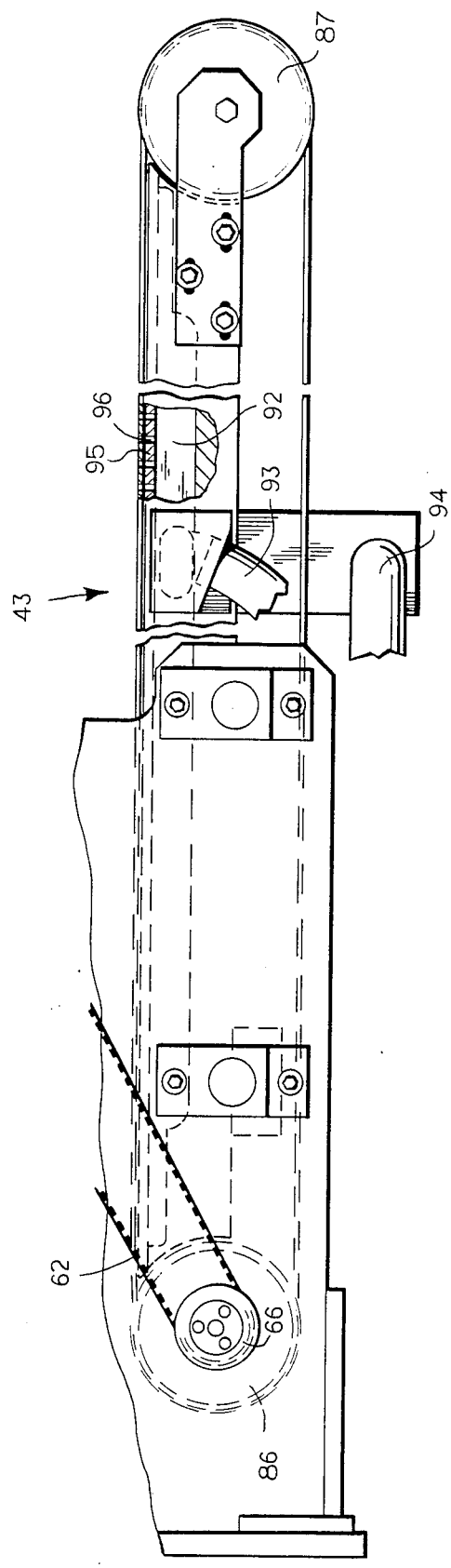
FIG. 6 is a fragmentary side elevational view of a conveyor portion of the apparatus.
Figure 7:
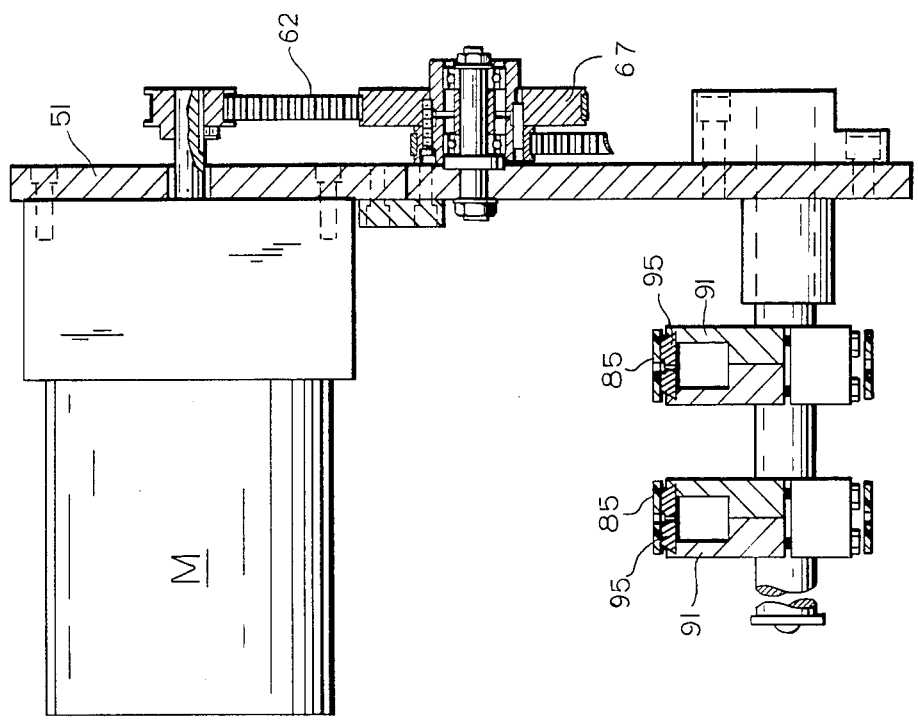
FIG. 7 is a fragmentary sectional view taken along the line 7—7 in FIG. 4.
Figure 21:
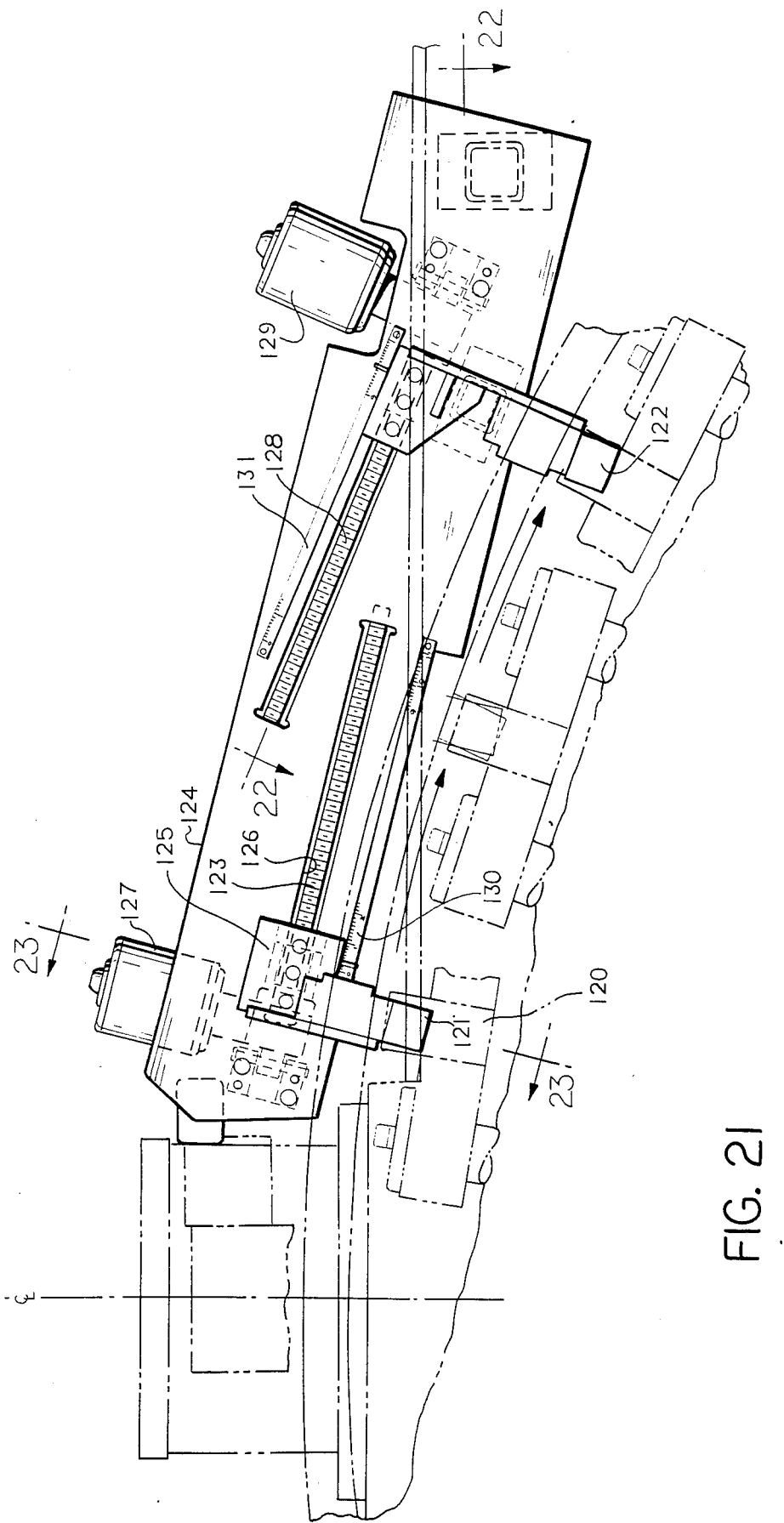
FIG. 21 is a fragmentary elevational view of another portion of the apparatus, parts being broken away.
Figure 22:
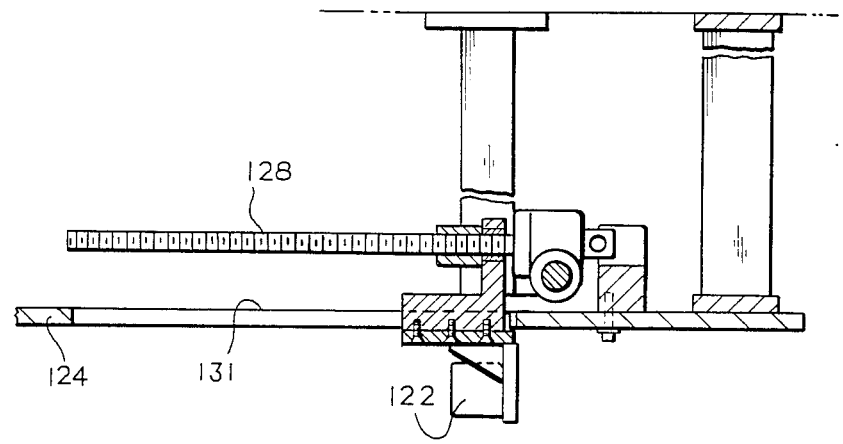
FIG. 22 is a fragmentary sectional view taken along the line 22—22 in FIG. 21.
Figure 23:
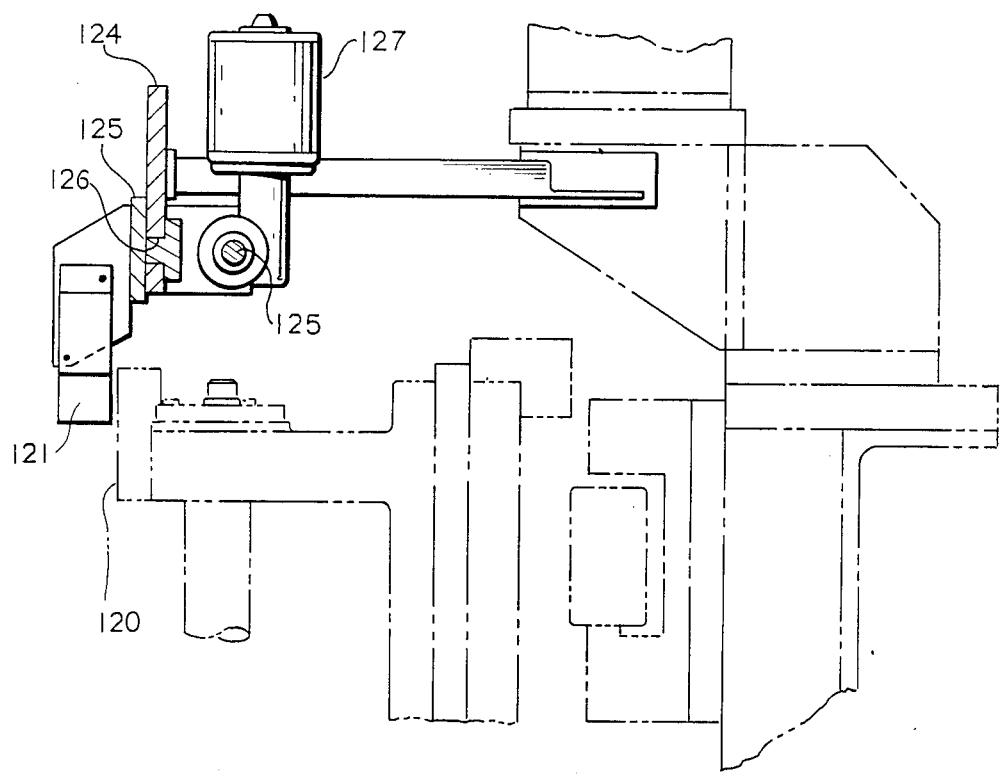
FIG. 23 is a fragmentary sectional view taken along the line 23—23 in FIG. 21.
Figure 24:
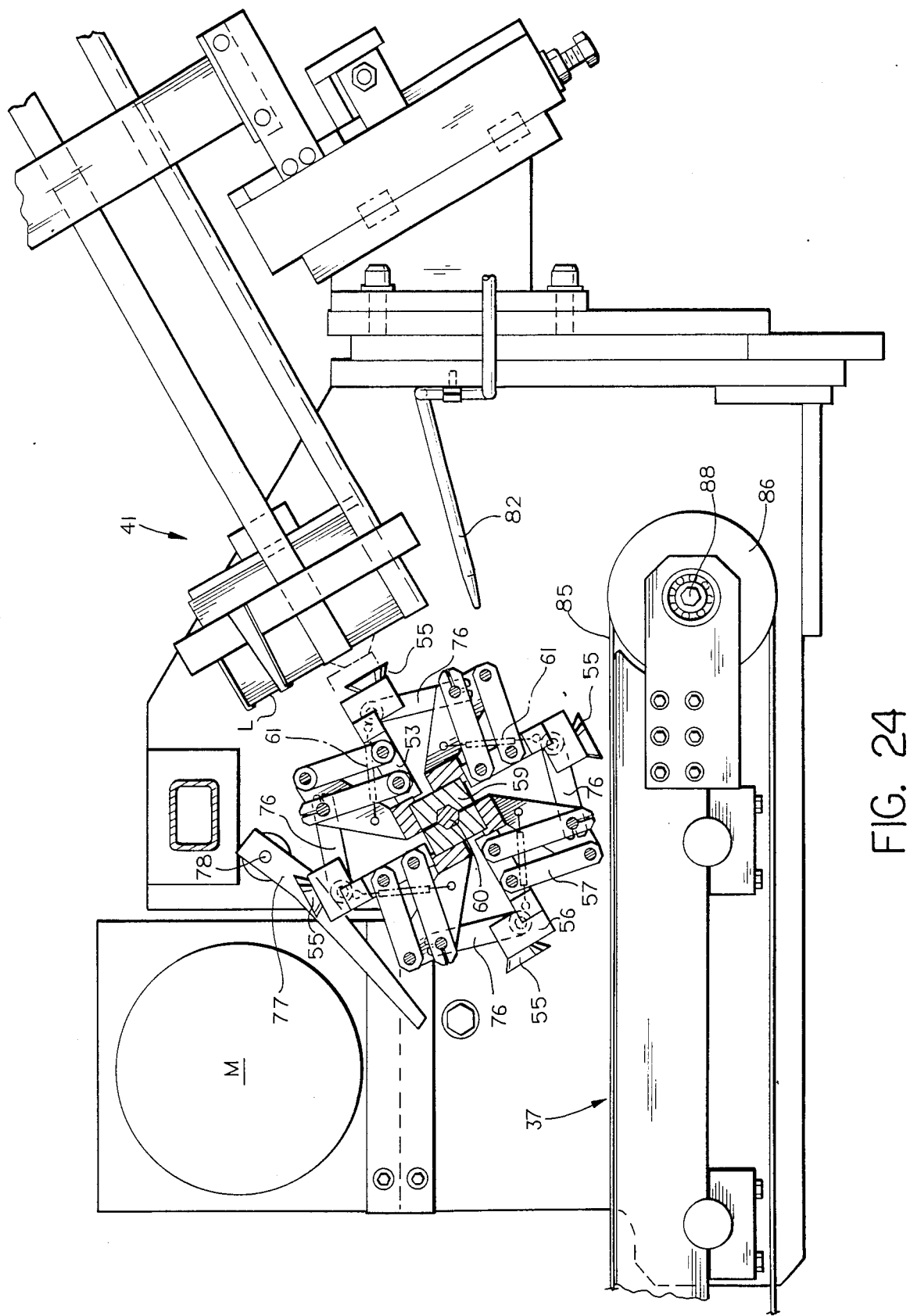
FIG. 24 is a fragmentary view of a portion of a modified apparatus.
Figure 25:
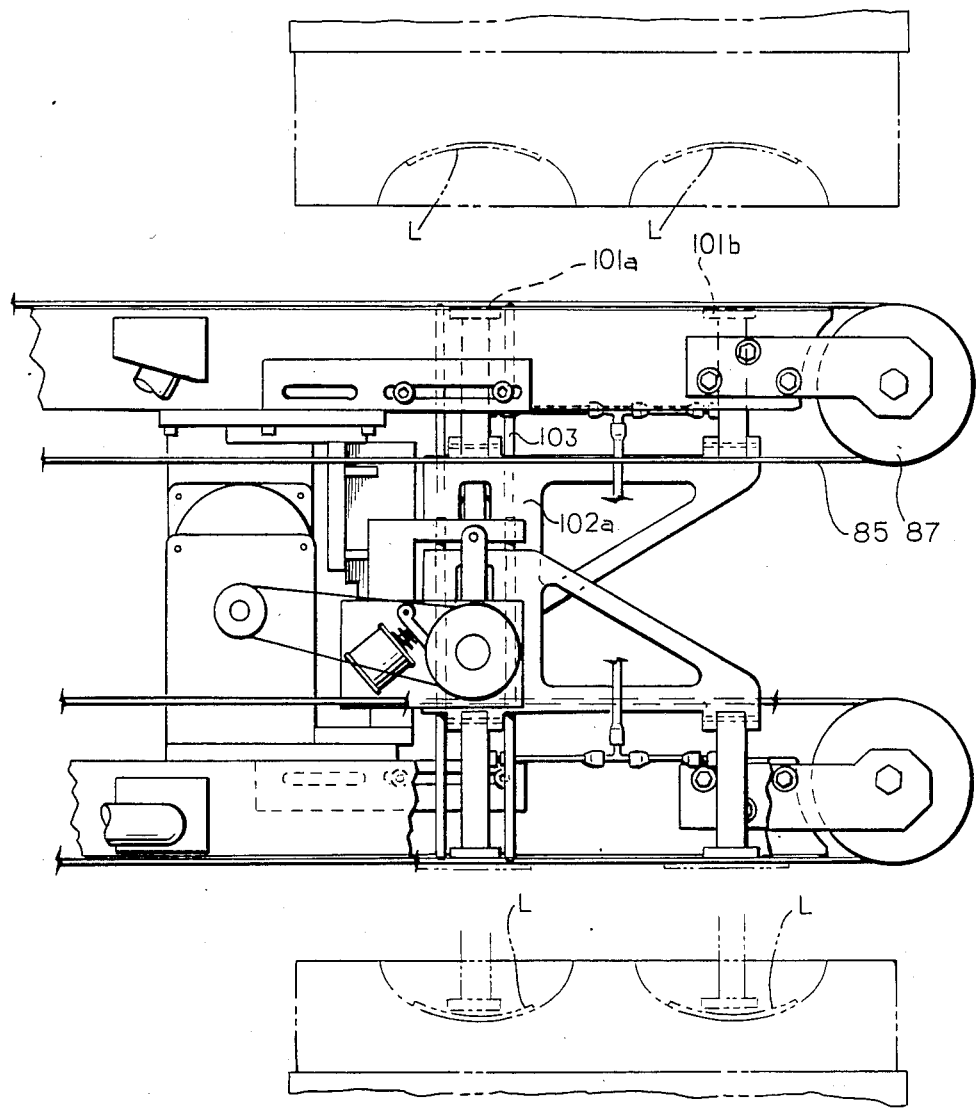
FIG. 25 is a fragmentary view of another portion of the modified apparatus.

If both labels applying mechanisms 36, 37 are to be used, for purposes of reducing the vertical spacing, the conveyors and associated mechanisms are spaced laterally as viewed in FIGS. 3 and 5. Accordingly, as shown in FIGS. 1, 21 and 22, it is necessary to have a second sensor 122 to provide a signal for energizing the lower label mechanism and delivering the label to the mold section 32 inasmuch as during the interval of time in passing from the position adjacent the upper label mechanism to the lower mechanism, the continuously moving mold will have moved circumferentially requiring a delay in energization of the lower label mechanism. Sensor block 121 is mounted on a threaded shaft 123 journalled on a plate 124 mounted on the frame for movement longitudinally of the shaft. More specifically, the block 121 is mounted on a bracket 125 that is slidable along a slot 126 in the plate 124. The output shaft of a motor 127 mounted on the plate is connected through a screw to the shaft 123 so that energization of the motor 127 will adjust the sensor 121 along the shaft. Similarly, the sensor 122 is mounted on a threaded shaft 128 journalled on the plate 124 and driven by a motor 129 in a manner similar to the connection of the shaft 123 to the motor 127. A scale 130, 131 is provided along the shafts 123, 128 for determining the position and setting of the sensors 121, 122.

Where the molds are such that two articles are to be simultaneously blown in the molds, two labels would need to be deposited within each cavity of each mold section. As shown in FIG. 25, this requires the addition of two opposed sets of vacuum pads 55 on the shaft 60 at 90° to the pairs of pads as shown in FIG. 25, spaced plate vacuum heads 101a, 101b are provided in place of the vacuum head 101 by use of a T-shaped slide 102a that replaces the slide 102. By this conversion, energization of the solenoid 112 retracts the pawl 111 permitting a single revolution which results in lifting a pair of labels off the belts by the pads 101a, 101b and returning of the pads 101a, 101b to their original position.

Figure 26A:
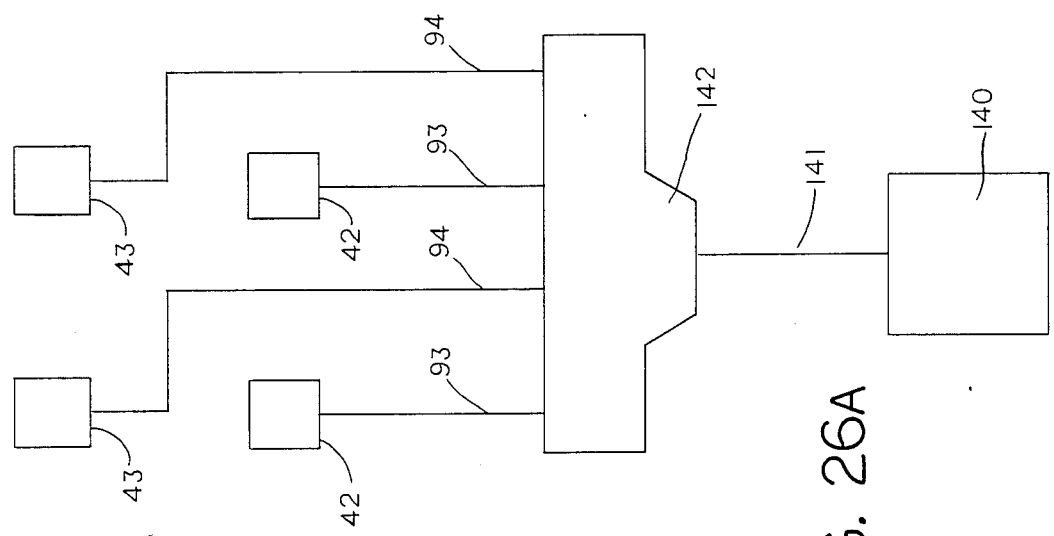
FIGS. 26A and 26B are pneumatic schematics.
Figure 26B:
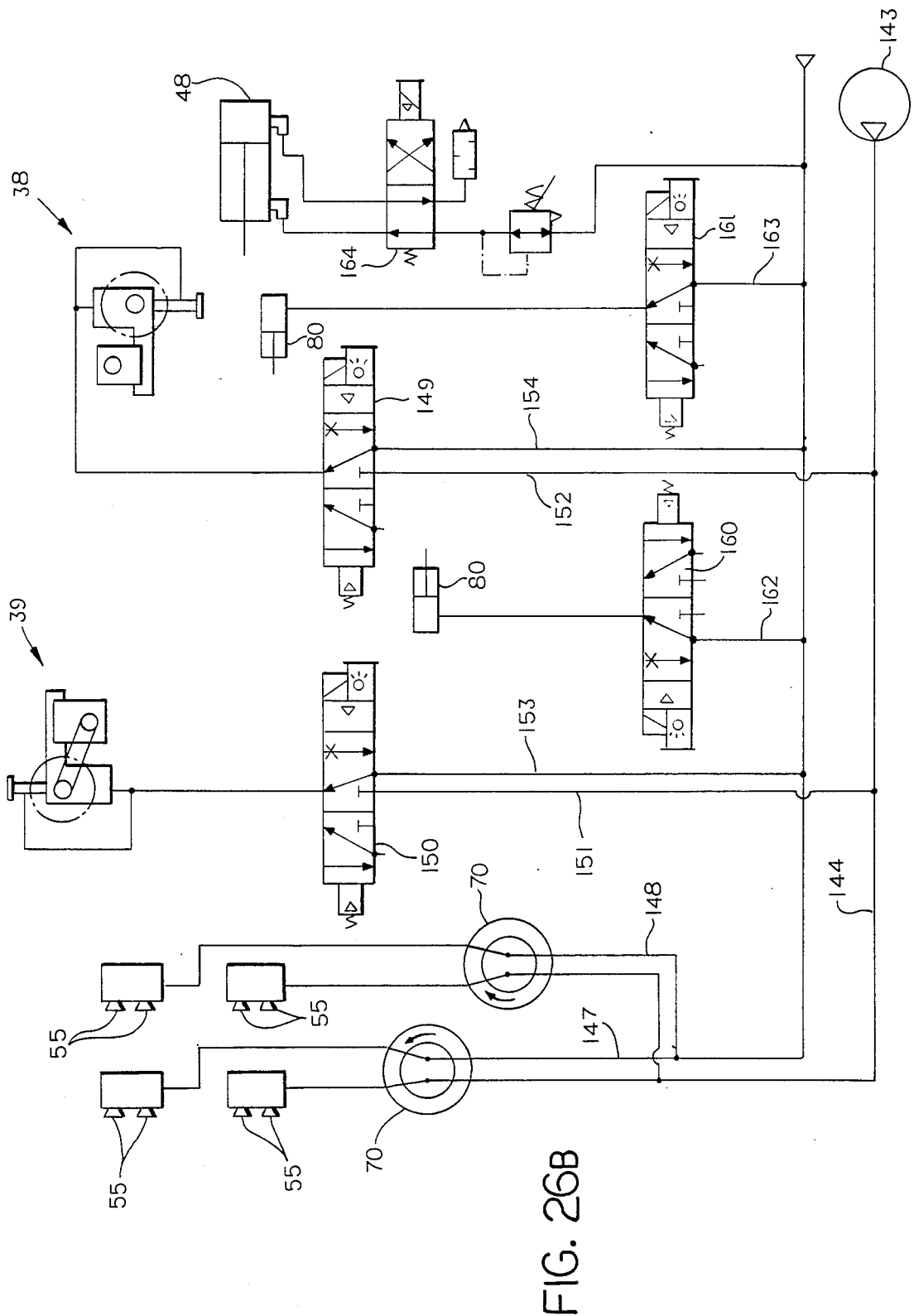

Referring to FIGS. 26A and 26B, the pneumatic schematic for the vacuum to the conveyors 42, 43 is shown as comprising a vacuum blower 140 which applies vacuum to a line 141 extending to a manifold 142 that, in turn, is connected through lines 93, 94 to the vacuum manifolds running lengthwise of the lower vacuum conveyor 42 and upper vacuum conveyor 43.

Referring to FIG. 25A, vacuum is supplied to the vacuum pickup cups 55 by a vacuum pump 143 through a line 141 and distributor valves 70 of the upper and lower label mechanisms. The distributor valves are also supplied with air from a source 146 through lines 147, 148.

The label placement mechanisms 38, 39 are similarly supplied with vacuum and air from the lines 144, 146 through valves 149, 150 connected by vacuum lines 151, 152 and air lines 153, 154.

The actuation of the pneumatic cylinders 80 of the upper and lower vacuum pickup mechanisms 38, 39 are controlled by valves 160, 161 connected to air line 146 by lines 162, 163, respectively.

Finally, air is supplied to the cylinder 48 for moving the slide 46 through a valve 164 connected to line 146.

Figure 27:
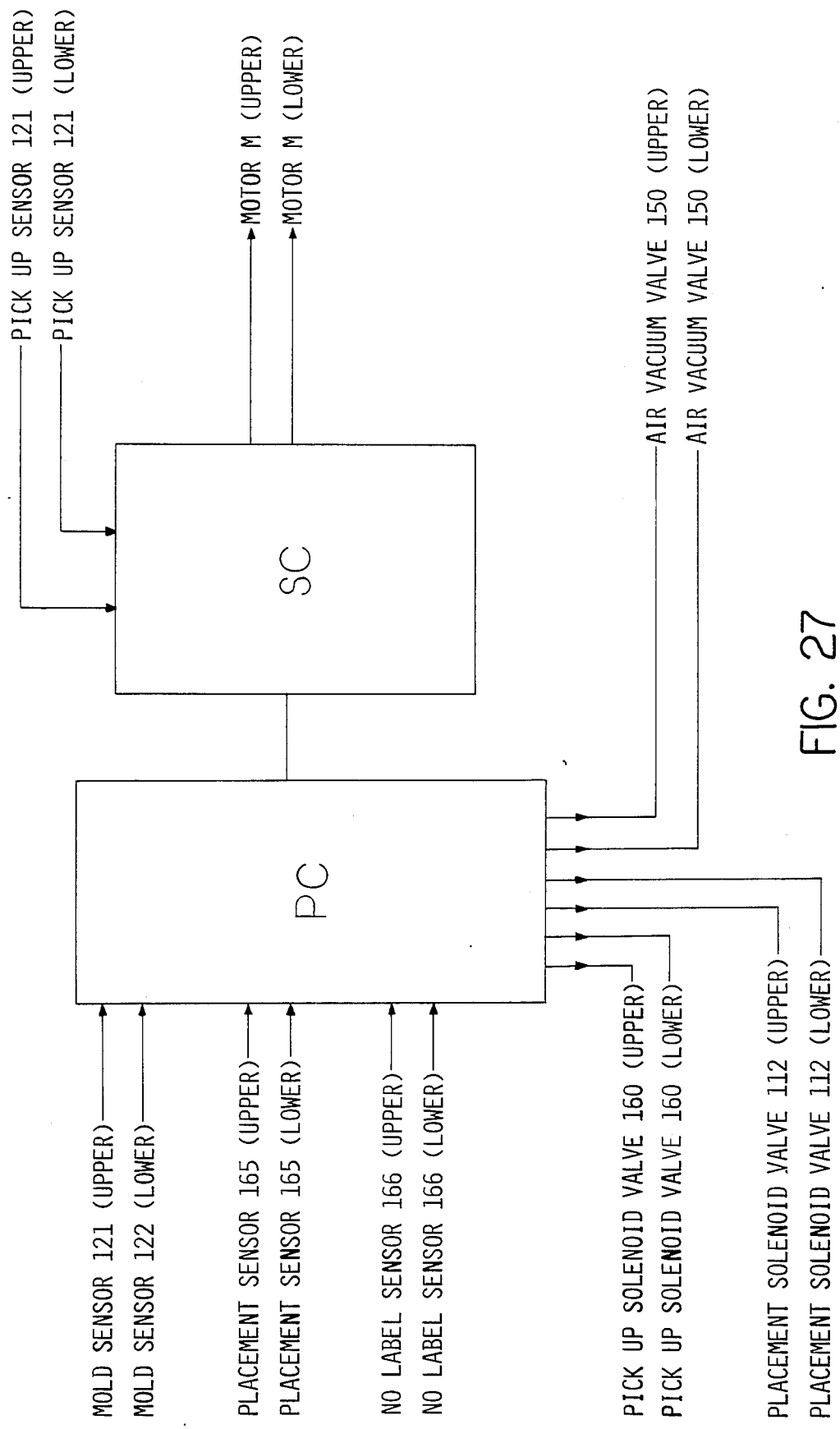
FIG. 27 is an electrical schematic.

Referring to FIG. 27 which is an electrical schematic, the control of the label mechanisms 36, 37 is achieved by utilizing a programmable controller PC and a servo controller SC and a plurality of sensors. The sensors comprise a sensor 84 associated with each of the vacuum pickup mechanisms 38, 39 indicating that the pickup mechanism is in a home position; sensors 165 associated with each label placement mechanism 44, 45 indicating the absence of a label at the label placement station; and sensors 166 associated with each label placement mechanism 44, 45 indicating the completion of a label delivery.

In a typical cycle, the power is supplied to the programmable controller PC so that the programmable controller PC logic will allow labeling to occur. The programmable controller PC initiates the pre-programmed index of the servo controller SC. The first portion of the servo index is a move to home position as sensed by the proximity switch 84 indicating that the vacuum pickup mechanisms 38, 39 are in correct position for picking a label off of the respective magazines. When the home position is reached, the servo controller SC stops the drive to the motors M and sends a NO MOTION signal to the programmable controller PC. At this point, the servo controller SC requires another signal from the programmable controller PC to initiate the second portion of its index.

Upon reception of the NO MOTION signal, the programmable controller PC energizes the solenoid operated valve 160 for actuating the label pickup mechanisms 36, 37 so that the respective mechanisms pick up a label and deliver it to the respective conveyors.

The proximity switches 121, 122 provide a signal to the programmable controller PC to initiate the second portion of the servo controller SC index and energize the solenoids 112 of the label placement mechanisms 44, 45.

The second portion of the servo controller SC index consists of a dwell to allow the pad 101 to extend into the mold and retract back again followed by motion designed to carry the next label into correct position. With the motion completed, the servo controller SC sends a NO MOTION signal to the programmable controller PC returning the electrical circuits to its status for the beginning of another cycle. The solenoids 112 of the label placement mechanism 44, 45 are energized by the programmable controller PC for only sufficient time to insure release. As each pad 101 extends, it moves away from the proximity switch 166 energizing the solenoid operated valve 150 to provide for a change from vacuum to air and thereby provide air sufficiently to blow the label off into the mold. The solenoids 112 remain energized until the switch 166 again receives the signal.

The no label sensors provide a NO LABEL SIGNAL. When such a signal is present, the energization of the motor M of one of the label mechanisms 35, 36 is inhibited without affecting the energization of the motor M of the other so that the other mechanism can be operated to index the next label on the conveyor into position. At the same time, the solenoids 112 of both label placement mechanisms 44, 45 are inhibited from operation. As a result, no labels will be applied to the plastic article. This facilitates the waste disposal because the plastic article then can be readily disposed of without necessitating separating the label from the article.

We claim:

1. In a blow molding apparatus comprising a plurality of sets of mold sections on a wheel rotatable about a horizontal axis wherein the mold sections are relatively moved radially toward and away from one another and when closed define a cavity which encloses a parison and the parison is then blown to the confines of the cavity between the mold sections as the wheel rotates, a first in-mold labeling apparatus comprising
   a first source of labels,
   first endless conveyor means having a first end extending from said first source of labels and a second end extending to a position adjacent a path of said open mold sections,
   first label pickup means adjacent the first source of labels for taking labels successively from the first source and delivering said labels to the first conveyor means,
   said first conveyor means being operable to receive labels from said first label pickup means adajcent the first end successively and carry the labels in a first path to the second end,
   first label placement means adjacent the second end of the first conveyor means, said first label placement means being positioned in the path of the open mold sections for successively removing labels from said first conveyor means and delivering said labels to a first section of each set of open mold sections and,
   first means for intermittently driving said first conveyor means carrying a series of labels in a direction to receive labels from said first label pickup means and to transfer the labels successively to said first label placement means.

2. The apparatus set forth in claim 1 wherein said first label pickup means comprises a plurality of sets of vacuum pads, means for mounting said pads for rotation about an axis of rotation transverse to the first conveyor means for movement in a circumferential direction extending in the same direction as the first path of the labels carried by the first conveyor means and for radial movement relative to said axis of rotation toward and away from said first source such that, upon rotation, said vacuum pads can be projected toward the source for picking up a label and can be retracted and rotated for delivering the first label to the conveyor means.

3. The apparatus set forth in claim 2 wherein said means for mounting said pads for radial movement to project and retract each set of vacuum pads radially comprises a hub mounted for rotation about said transverse axis, a parallelogram linkage, said linkage being connected at a first end of said linkage to said hub and supporting the vacuum pads at a second end of said linkage, and means for projecting and retracting said parallelogram linkage.

4. The apparatus set forth in claim 3 wherein said means for projecting and retracting said parallelogram linkage comprises a lever connected to said parallelogram linkage,
   a cam engaging said lever and means for moving said cam into and out of position for extending and retracting said pads.

5. The apparatus set forth in claim 3 including means for supplying and controlling vacuum and air to said vacuum pads.

6. The apparatus set forth in claim 1 wherein said first conveyor means comprises a first set of spaced endless conveyor belts having openings therein,
   manifolds associated with said first set of endless conveyor belts for applying a vacuum to said belts and, in turn, the labels on the belts.

7. The apparatus set forth in claim 6 wherein said first label placement means comprises a first head mounted for movement in a direction perpendicular to the plane of the belts and means for moving said first head in said direction toward and away from the mold section to which the label is to be delivered.

8. The apparatus set forth in claim 7 wherein said means for moving said first head toward and away from the mold section comprises a motor and clutch means periodically operated for moving said first head toward and away from a mold section.

9. The apparatus set forth in anyof claims 1–8 wherein said first label pickup means, first conveyor means and first label placement means are mounted on a single frame.

10. The apparatus set forth in claim 1 wherein said first label pickup means and first conveyor means are driven from a common drive.

11. The apparatus set forth in any of claims 1-8 or 10 including a second in-mold labeling apparatus comprising
a second source of labels,
a second endless conveyor means having a first end extending from said second source of labels and a second end extending to a position adjacent a path of the open mold sections,
second label pickup means adjacent the second source of labels for taking labels successively from the second source and delivering said labels to the second endless conveyor means,
said second conveyor means being operable to receive labels from said second label pickup means adjacent the first end successively and carry the labels in a second path to the second end,
a second label placement means adjacent the second end of the second endless conveyor means, said second label placement means being positioned in the path of the open mold sections for successively removing labels from said second endless conveyor and delivering them to a second section of each set of open mold sections whereby a pair of labels can be delivered on to each mold section of each set of mold sections,
second means for intermittently driving said second conveyor means in a direction to receive labels from said second label pickup means and transfer labels successively to said second label placement means.

12. The apparatus set forth in claim 11 wherein said second in-mold labeling apparatus is positioned circumferentially with respect to the first in-mold labeling apparatus such that the second in-mold labeling apparatus may be actuated successively with respect to the first in-mold labeling apparatus to accommodate for relative movement of the molds on the wheel during the continuous rotation of the wheel and deliver a label to each mold section of a set of mold sections.

13. The apparatus set forth in claim 12 including first means for sensing a position of one set of the mold sections with respect to the first in-mold labeling apparatus and actuating said first in-mold labeling apparatus to deliver at least one label to a first section of a set of said mold sections and second means for sensing a position of said one set of mold sections with respect to the second in-mold labeling apparatus and actuating said second in-mold labeling apparatus to deliver at least one label to a second section of a set of mold sections.

14. The apparatus set forth in claim 13 wherein said first and second sensing means comprise sensors circumferentially spaced about the wheel and sensor actuators on the wheel, respectively.

15. The apparatus set forth in claim 14 wherein each of said first means and second sensing means comprises means for adjusting each sensor circumferentially.

16. The apparatus set forth in claim 1 including means responsive to the delivery of a label by said first label pickup means to the first conveyor means to actuate the first conveyor means for movement.

17. The apparatus set forth in claim 1 including means responsive to the position of a mold adjacent the first label placement means for actuating the first label placement means to delivery the label to the first mold section.

18. The apparatus set forth in claim 17 including means responsive to the absence of a label at the first label placement means to inhibit operation of the first label placement means.

19. The apparatus set forth in claim 1 including electronic means for sensing the presence of a label on said first conveyor means adjacent said first label placement means for permitting actuation of said first placement means if a label is present or inhibiting the actuation of said first label placement means if a label is absent.

20. The apparatus set forth in claim 19 wherein said first label pickup means and first conveyor means have a common drive, said electronic means being operable when a label is not present to energize the drive to said first label pickup means and first conveyor means while inhibiting the actuation of said first label placement means.

21. In a blow molding apparatus comprising a plurality of sets of mold sections on a wheel rotatable about a horizontal axis wherein the mold sections are relatively moved radially toward and away from one another and when closed define a cavity which encloses a parison and the parison is then blown to the confines of the cavity between the mold sections as the wheel rotates, an in-mold labeling apparatus comprising
a first in mold applying mechanism and a second in mold label applying mechanism associated with each mold section,
each first and second in mold label applying mechanism comprising
a source of labels,
a conveyor extending from each said source of labels to a position adjacent the open mold sections,
a label pickup mechanism adjacent each source of labels for taking labels successively from each said source of labels and delivering them to a first end of respective first and second conveyor,
a label placement mechanism adjacent a second end of each conveyor positioned in a path of the open mold sections for successively removing labels from a respective conveyor and delivering said labels to a respective mold section, and
means individual to each conveyor for intermittently driving said conveyor in a direction to receive labels from its respective label pickup mechanism and transfer labels in a path successively to its respective label placement mechanism.

22. The apparatus set forth in claim 21 wherein each said label pickup mechanism comprises a plurality of sets of vacuum pads, means for mounting said sets of pads for rotation about an axis of rotation transverse to the conveyor means for movement in a circumferential direction extending in the same direction as the path of labels carried by the respective conveyor and for radial movement relative to said axis of rotation toward and away from a respective source of labels such that upon rotation, said vacuum pads can be projected toward a source of labels for picking up a label and retracted and rotated for delivering the label to the respective conveyor.

23. The apparatus set forth in claim 22 wherein each means for mounting said pads for radial movement to project and retract each set of vacuum pads radially comprises a hub mounted for rotation about said transverse axis, a parallelogram linkage, said linkage being connected at a first end to said hub of said linkage and supporting the vacuum pads at a second end of said linkage, and means for projecting and retracting said linkage.

24. The apparatus set forth in claim 23 wherein each said mechanism for projecting and retracting said parallelogram linkage comprises a lever connected to said parallelogram linkage, a cam engaging said lever and means for moving said cam into and out of position for extending and retracting said pads.

25. The apparatus set forth in claim 24 including means for supplying and controlling vacuum and air to said vacuum pads of each said label pickup mechanism.

26. The apparatus set forth in claim 21 wherein each said conveyor comprises spaced endless conveyor belts having openings therein, manifolds associated with said belts for applying a vacuum to said belts and, in turn, the labels on the belts.

27. The apparatus set forth in claim 26 wherein each said label placement mechanism comprises a head mounted for movement transversely between said belts and means for moving said head transversely toward and away from the mold section to which the label is to be delivered.

28. The apparatus set forth in claim 27 wherein each said means for moving said head transversely toward and away from the mold section comprises a motor and clutch means periodically operated for moving said respective head toward and away from a mold section.

29. The apparatus set forth in any of claims 21-28 wherein each said label pickup mechanism, each conveyor and each label placement mechanism are mounted on a single frame.

30. The apparatus set forth in claim 21 wherein each said in mold applying mechanism has a common drive.

31. The apparatus set forth in claim 21 wherein said second in-mold label applying mechanism is positioned circumferentially with respect to the first in-mold label applying mechanism such that the second in-mold label applying mechanism may be actuated successively with respect to the first in-mold label applying mechanism to accomodate for relative movement of the molds on the wheel during continuous rotation of the wheel.

32. The apparatus set forth in claim 31 including first means for sensing the position of one set of the mold sections with respect to the first in-mold label applying mechanism and actuating said first in-mold label applying mechanism to deliver at least one label to a first section of a set of said mold sections and second means for sensing the position of said one set of mold sections with respect to the second in-mold label applying mechanism and actuating said second in-mold label applying mechanism to deliver at least one label to a second section of a set of mold sections.

33. The apparatus set forth in claim 32 wherein said first and second sensing means comprise sensors circumferentially spaced about the wheel and sensor actuators on the wheel, respectively.

34. The apparatus set forth in claim 33 wherein each of said first means and second sensing means comprises means for adjusting each sensor circumferentially.

35. The apparatus set forth in claim 21 including means responsive to the delivery of a label by each said label pickup mechanism to its respective conveyor to actuate its respective conveyor.

36. The apparatus set forth in claim 21 including means responsive to the position of a mold adjacent each label placement mechanism for actuating the label placement mechanism to deliver a label to the respective mold section.

37. The apparatus set forth in claim 36 including means responsive to the absence of a label at each label placement mechanism to inhibit operation of the label placement mechanism.

38. The apparatus set forth in claim 21 including electronic means for sensing the presence of a label on each said conveyor adjacent its respective label placement mechanism for permitting actuation of said respective label placement mechanism if a label is present or inhibiting the actuation of said respective label placement mechanism if a label is absent.

39. The apparatus set forth in claim 38 wherein each said label pickup mechanism and conveyor have a common drive, said electronic means being operable when a label is not present to energize the drive to said respective label pickup mechanism and conveyor while inhibiting the actuation of said label placement means.

40. In a blow molding apparatus comprising a plurality of sets of mold sections on a wheel rotatable about a horizontal axis wherein the mold sections are relatively moved radially toward and away from one another and when closed define a cavity which encloses a parison and the parison is then blown to the confines of the cavity between the mold sections as the wheel rotates, an in-mold labeling apparatus comprising a first in mold applying mechanism and a second in mold label applying mechanism associated with each mold section, each first and second in mold label applying mechanism comprising a source of labels, an endless conveyor having a first end extending from each said source of labels and a second end extending to a position adjacent a path of said open mold sections, a label placement mechanism adjacent the second end of each conveyor positioned in a path of the open mold sections for successively removing labels from a respective conveyor and delivering said label to a respective open mold section of each set, said second in-mold label applying mechanism being positioned circumferentially with respect to the first in-mold label applying mechanism such that the second in-mold label applying mechanism may be actuated successively with respect to the first in-mold label applying mechanism to accommodate for relative movement of the mold sections on the wheel during continuous rotation of the wheel for supplying a label to each mold section of a set of mold sections.

41. The apparatus set forth in claim 40 including first means for sensing the position of one set of mold sections with respect to the first in-mold label applying mechanism and actuating said first in-mold label applying mechanism to deliver at least one label to a first section of a set of said mold sections and second means for sensing the position of said one set of mold sections with respect to the second in-mold label applying mechanism and actuating said second in-mold label applying mechanism to deliver at least one label to a second section of a set of said mold sections.

42. The apparatus set forth in claim 41 wherein said first and second sensing means comprise sensors circumferentially spaced about the wheel and sensor actuators on the wheel, respectively.

43. The apparatus set forth in claim 42 wherein each of said first means and second sensing means comprises means for adjusting each sensor circumferentially.

44. An in-mold labeling apparatus for use in a blow molding apparatus wherein said blow molding apparatus comprises sets of mold sections wherein the mold sections are moved toward and away from one another and when closed define a mold cavity which encloses a parison and the parison is blown to the confines of the cavity, said in-mold labeling apparatus comprising
a first source of labels,
first endless conveyor means having a first end extending from said first source and a second end adapted to a position adjacent a path of said open mold sections,
first label pickup means adjacent the source of labels for taking labels successively from the source of labels and delivering them to the first conveyor means,
said first conveyor means being operable to receive labels from said first label pickup means adjacent the first end successively and carry the labels in a first path to the second end,
first label placement means adjacent the second end of the first conveyor means, said label placement means being adapted to be positioned in the path of the open mold sections for successively removing labels from said first conveyor means and delivering said labels to a first section of each set of mold sections and,
first means for intermittently driving said first endless conveyor means carrying a series of labels in a direction to receive labels from said first label pickup means and to transfer the labels successively to said first label placement means.

45. The apparatus set forth in claim 44 wherein said first label pickup means comprises a plurality of sets of vacuum pads, means for mounting said pads for rotation about an axis of rotation transverse to the first conveyor means for movement in a circumferential direction extending in the same direction as the first path of the labels carried by the first conveyor means and for radial movement relative to said axis of rotation toward and away from said first source such that, upon rotation, said vacuum pads can be projected toward the source for picking up a label and can be retracted and rotated for delivering the label to the first conveyor means.

46. The apparatus set forth in claim 45 wherein said means for mounting said pads for radial movement to project and retract each set of vacuum pads radially comprises a hub mounted for rotation about said transverse axis, a parallelogram linkage, said linkage being connected at a first end of said linkage to said hub and supporting the vacuum pads at a second end of said linkage, and means for projecting and retracting said parallelogram linkage.

47. The apparatus set forth in claim 46 wherein said means for projecting and retracting said parallelogram linkage comprises a lever connected to said parallelogram linkage,
a cam engaging said lever and means for moving said cam into and out of position for extending and retracting said pads.

48. The apparatus set forth in claim 46 including means for supplying and controlling the application of vacuum and air to said vacuum pads.

49. The apparatus set forth in claim 44 wherein said first conveyor means comprises a first set of spaced endless conveyor belts having openings therein,
manifolds associated with said first set of endless conveyor belts for applying vacuum to said belts and, in turn, the labels on the belts.

50. The apparatus set forth in claim 49 wherein said label placement means comprises a first head mounted for movement in a direction perpendicular to the plane of the belts and means for moving said first head in said direction toward and away from the mold section to which the label is to be delivered.

51. The apparatus set forth in claim 50 wherein said means for moving said first head transversely toward and away from the mold section comprises a motor and clutch means periodically operated for moving said first head toward and away from a mold section.

52. The apparatus set forth in claim 51 wherein said first label pickup means, first conveyor means and first label placement means are mounted on a single frame.

53. The apparatus set forth in claim 44 wherein said first label pickup means and first conveyor means are driven from a common drive.

54. The apparatus set forth in claim 44 including a second in-mold labeling apparatus comprising
a second source of labels,
a second endless conveyor means having a first end extending from said second source of labels and a second end extending to a position adjacent a path of the open mold sections,
second label pickup means adjacent the second source of labels for taking labels successively from the second source and delivering said labels to the second endless conveyor means,
said second conveyor means being operable to receive labels from said second label pickup means adjacent the first end successively and carry the labels in a second path to the second end,
a second label placement means adjacent the second end of the second endless conveyor means, said second label placement means being positioned in the path of the open mold sections for successively removing labels from said second endless conveyor and delivering them to a second section of each set of open mold sections whereby a pair of labels can be delivered on to each mold section of each set of mold sections,
second means for intermittently driving said second conveyor means in a direction to receive labels from said second label pickup means and transfer labels successively to said second label placement means.

55. The apparatus set forth in claim 54 wherein said second in-mold labeling apparatus is positioned circumferentially with respect to the first in-mold labeling apparatus such that the second in-mold labeling apparatus may be actuated successively with respect to the first in-mold labeling apparatus to accommodate for relative movement of the molds on the wheel during the continuous rotation of the wheel and deliver a label to each mold section of a set of mold sections.

56. The apparatus set forth in claim 55 including first means for sensing a position of one set of the mold sections with respect to the first in-mold labeling apparatus and actuating said first in-mold labeling apparatus to deliver at least one label to a first section of a set of said mold sections and second means for sensing a position of said one set of mold sections with respect to the second in-mold labeling apparatus and actuating said second in-mold labeling apparatus to deliver at least one label to a second section of a set of mold sections.

57. The apparatus set forth in claim 56 wherein said first and second sensing means comprise sensors circumferentially spaced about the wheel and sensor actuators on the wheel, respectively.

58. The apparatus set forth in claim 57 wherein each of said first means and second sensing means comprises means for adjusting each sensor circumferentially.

59. The apparatus set forth in claim 44 including means responsive to the delivery of a label by said first label pickup means to the first conveyor means to actuate the first conveyor means for movement.

60. The apparatus set forth in claim 44 including means responsive to the position of a mold adjacent the first label placement means for actuating the first label placement means to deliver the label to the first mold section.

61. The apparatus set forth in claim 60 including means responsive to the absence of a label at the first label placement means to inhibit operation of the label placement means.

62. The apparatus set forth in claim 44 including electronic means for sensing the presence of a label on said first conveyor means adjacent said first label placement means for permitting actuation of said first placement means if a label is present or inhibiting the actuation of said first label placement means if a label is absent.

63. The apparatus set forth in claim 62 wherein said first label pickup means and first conveyor means have a common drive, said electronic means being operable when a label is not present to energize the drive to said first label pickup means and first conveyor means while inhibiting the actuation of said first label placement means.

* * * * *